(12) United States Patent
Zhan et al.

(10) Patent No.: US 11,762,431 B2
(45) Date of Patent: Sep. 19, 2023

(54) ROTATING SHAFT STRUCTURE AND ELECTRONIC DEVICE

(71) Applicant: Huawei Technologies Co., Ltd., Shenzhen (CN)

(72) Inventors: Qiang Zhan, Shanghai (CN); Li Liao, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/370,677

(22) Filed: Jul. 8, 2021

(65) Prior Publication Data

US 2022/0011828 A1 Jan. 13, 2022

(30) Foreign Application Priority Data

Jul. 8, 2020 (CN) .......................... 202010651834.4

(51) Int. Cl.
*G06F 1/16* (2006.01)

(52) U.S. Cl.
CPC ................................. *G06F 1/1681* (2013.01)

(58) Field of Classification Search
CPC .... G06F 1/1681; G06F 1/1616; G06F 1/1652; F16C 11/045; F16C 11/12
See application file for complete search history.

(56) References Cited

U.S. PATENT DOCUMENTS

| | | | | |
|---|---|---|---|---|
| 3,583,734 A | * | 6/1971 | Magi | F16C 11/10 248/478 |
| 7,155,266 B2 | * | 12/2006 | Stefansen | H04M 1/022 455/90.3 |
| 8,096,020 B2 | * | 1/2012 | Tang | G06F 1/1616 16/337 |
| 8,782,853 B2 | * | 7/2014 | Ge | G06F 1/1681 248/292.12 |
| 8,854,834 B2 | * | 10/2014 | O'Connor | G06F 1/1641 16/334 |

(Continued)

FOREIGN PATENT DOCUMENTS

| | | |
|---|---|---|
| CN | 109712537 A | 5/2019 |
| CN | 109979328 A | 7/2019 |

(Continued)

*Primary Examiner* — Anthony M Haughton
*Assistant Examiner* — Theron S Milliser
(74) *Attorney, Agent, or Firm* — Leydig, Voit & Mayer, Ltd.

(57) ABSTRACT

A rotating shaft structure includes a damping component, a first shaft body and a second shaft body. A first limiting slot is disposed on a circumferential surface of the first shaft body. The damping component is located between the first shaft body and the second shaft body. The damping component includes one or more damping groups. Each damping group includes an elastic part and a first ball. The first ball abuts against the circumferential surface of the first shaft body by using elastic force of the elastic part. A second end of the elastic part is elastically connected to the circumferential surface of the second shaft body. In a rotation process of the first shaft body, the first ball rolls relative to the circumferential surface of the first shaft body and can be positioned in the first limiting slot.

20 Claims, 9 Drawing Sheets

(56) References Cited

U.S. PATENT DOCUMENTS

| | | | | |
|---|---|---|---|---|
| 8,959,716 B2* | 2/2015 | Hsu | ................ | G06F 1/1681 |
| | | | | 16/302 |
| 9,665,126 B2* | 5/2017 | O'Connor | ............ | H04M 1/022 |
| 10,028,395 B2* | 7/2018 | Chen | ................ | G06F 1/1626 |
| 10,222,821 B1* | 3/2019 | Chiang | ............... | B23Q 11/04 |
| 10,827,631 B2* | 11/2020 | Liu | ................ | G09F 9/301 |
| 10,990,138 B1* | 4/2021 | Bao | ................ | G06F 1/1615 |
| 2005/0239520 A1* | 10/2005 | Stefansen | ............ | H04M 1/022 |
| | | | | 455/575.1 |
| 2007/0164924 A1* | 7/2007 | Anderson | ............ | H04M 1/022 |
| | | | | 345/1.1 |
| 2010/0031471 A1* | 2/2010 | Tang | ................ | G06F 1/1616 |
| | | | | 16/250 |
| 2010/0071159 A1* | 3/2010 | Myung | ............... | H04M 1/022 |
| | | | | 16/303 |
| 2012/0120627 A1* | 5/2012 | O'Connor | ............ | H04M 1/022 |
| | | | | 16/374 |
| 2013/0219661 A1* | 8/2013 | Ge | ............... | E05D 3/06 |
| | | | | 16/367 |
| 2014/0290008 A1* | 10/2014 | Hsu | ................ | E05D 11/06 |
| | | | | 16/386 |
| 2014/0373338 A1* | 12/2014 | O'Connor | ............ | G06F 1/1681 |
| | | | | 29/592.1 |
| 2018/0146560 A1* | 5/2018 | Chen | ................ | H05K 5/0017 |
| 2019/0346889 A1 | 11/2019 | Chen et al. | | |
| 2019/0373743 A1* | 12/2019 | Liu | ................ | G06F 1/1652 |

FOREIGN PATENT DOCUMENTS

| | | |
|---|---|---|
| CN | 110007715 A | 7/2019 |
| CN | 110010008 A | 7/2019 |
| CN | 209430596 U | 9/2019 |
| CN | 110552953 A | 12/2019 |
| CN | 209724948 U | 12/2019 |
| CN | 209731301 U | 12/2019 |
| CN | 209881840 U | 12/2019 |
| CN | 210007737 U | 1/2020 |
| KR | 101487189 B1 | 1/2015 |
| WO | 2018082338 A1 | 5/2018 |

* cited by examiner

ROTATING SHAFT STRUCTURE AND ELECTRONIC DEVICE

CROSS-REFERENCE TO RELATED APPLICATIONS

This application claims priority to Chinese Patent Application No. 202010651834.4, filed on Jul. 8, 2020, which is hereby incorporated by reference in its entirety.

TECHNICAL FIELD

Embodiments of this disclosure relate to the field of electronic device technologies, and in particular, to a rotating shaft structure and an electronic device.

BACKGROUND

With increasingly mature development of a flexible foldable screen technology, a flexible foldable terminal product has become a major trend. The foldable terminal product (for example, an electronic device such as a foldable mobile phone, a foldable tablet, or a foldable computer) needs to meet relatively high reliability, relatively good operation experience, and a pretty appearance. A rotating shaft structure is a core functional component of the foldable terminal product. Reliability and operation of the rotating shaft structure greatly depends on performance of a damping structure. The damping structure is configured to control opening and closing of the rotating shaft structure, to provide certain damping and protection functions for the rotating shaft structure. In this way, balanced force bearing is implemented for the rotating shaft structure in opening and closing processes. Currently, the rotating shaft structure in the market is not smooth during folding, causing an inferior experience.

SUMMARY

This disclosure provides a rotating shaft structure, to resolve a prior-art problem of an inferior experience because a rotating shaft structure is not smooth during a folding operation.

This disclosure further provides an electronic device.

The rotating shaft structure in this disclosure includes a main shaft component and a damping component.

The main shaft component includes a first shaft body and a second shaft body. The first shaft body and the second shaft body are spaced and disposed opposite to each other. A first limiting slot is disposed on a circumferential surface of the first shaft body.

The damping component is located between the circumferential surface of the first shaft body and a circumferential surface of the second shaft body. It may be understood that the circumferential surface of the first shaft body is a surface obtained through rotating the first shaft body around an axis of the first shaft body, and the circumferential surface of the second shaft body is a surface obtained through rotating the second shaft body around an axis of the second shaft body. The damping component includes one or more damping groups. Each damping group includes an elastic part and a first ball. The first ball is located at a first end of the elastic part. The first ball abuts against the circumferential surface of the first shaft body by using elastic force of the elastic part. A second end that is of the elastic part and that is opposite to the first end is elastically connected to the circumferential surface of the second shaft body.

In a rotation process of the first shaft body, the first ball rolls relative to the circumferential surface of the first shaft body and can be positioned in the first limiting slot.

In this disclosure, the damping component is disposed between the circumferential surface of the first shaft body and the circumferential surface of the second shaft body in the rotating shaft structure, so that the first ball of the damping group is located at the first end of the elastic part of the damping group. The first ball abuts against the circumferential surface of the first shaft body by using the elastic force of the elastic part. In the rotation process of the first shaft body, the first ball rolls relative to the circumferential surface of the first shaft body and can be positioned in the first limiting slot, to implement clamping of the rotating shaft structure and maintain the rotating shaft structure in a flattened state. Because the first ball is spherical, in the rotation process of the first shaft body, a contact area between the first ball and each of the circumferential surface of the first shaft body and the first limiting slot is small. In this case, friction is small. In this way, the first ball rolls more smoothly on the circumferential surface of the first shaft body and the first limiting slot, to improve folding and unfolding experience of the rotating shaft structure. In addition, rolling abrasion between the first ball and each of the circumferential surface of the first shaft body and the first limiting slot is small, to effectively improve service life of the damping component. In addition, when the first ball enters the first limiting slot, the elastic part provides thrust force for the first ball, to push the first ball into the first limiting slot. In this process, a user can clearly perceive a force change, to obtain information that the rotating shaft structure is in the flattened state, thereby improving user experience.

In an implementation, each damping group further includes a second ball. The second ball is located at the second end of the elastic part. The second ball abuts against the circumferential surface of the second shaft body by using the elastic force of the elastic part. A second limiting slot is disposed on the circumferential surface of the second shaft body. In a rotation process of the second shaft body, the second ball rolls relative to the circumferential surface of the second shaft body and can be positioned in the second limiting slot, to clamp the rotating shaft structure and maintain the rotating shaft structure in the flattened state. In other words, when the rotating shaft structure is in the flattened state, the two opposite ends of the elastic part abut between the first shaft body and the second shaft body by using the balls. Clamping is implemented between the first shaft body and the second shaft body, to ensure balanced force bearing between the first shaft body and the second shaft body and ensure more stable clamping of the first shaft body and the second shaft body. Because the second ball is spherical, in the rotation process of the second shaft body, a contact area between the second ball and each of the circumferential surface of the second shaft body and the second limiting slot is small. In this case, friction is small. In this way, the second ball rolls more smoothly on the circumferential surface of the second shaft body and the second limiting slot, to improve folding and unfolding experience of the rotating shaft structure. In addition, rolling abrasion between the second ball and each of the circumferential surface of the second shaft body and the second limiting slot is small, to effectively improve service life of the damping component. In addition, when the second ball enters the second limiting slot, the elastic part provides a thrust force for the second ball, to push the second ball into the second limiting slot. In this process, the user can clearly perceive a force change, to obtain information that the rotating shaft structure is in the flattened state, thereby improving user experience.

In an implementation, the rotating shaft structure further includes a first rotating part and a second rotating part. The first rotating part and the second rotating part can rotate relative to each other. The first rotating part is fastened to the first shaft body. The second rotating part is fastened to the second shaft body. The first shaft body and the second shaft body respectively rotate with rotation of the first rotating part and the second rotating part. When the rotating shaft structure is in the flattened state, the first rotating part and the second rotating part are flattened relative to each other, the first ball is in the first limiting slot, and the second ball is in the second limiting slot. In the rotating shaft structure, the first shaft body is disposed on the first rotating part, the second shaft body is disposed on the second rotating part, and the damping component is disposed between the first shaft body and the second shaft body. When the first rotating part and the second rotating part rotate relative to each other, the first rotating part and the second rotating part respectively drive the first shaft body and the second shaft body to rotate relative to each other. In the rotation process of the first shaft body and the second shaft body, the first ball abuts against the circumferential surface of the first shaft body, and the second ball abuts against the circumferential surface of the second shaft body. When the rotating shaft structure is in the flattened state, the first rotating part and the second rotating part are flattened relative to each other, the first ball enters the first limiting slot of the first shaft body to implement clamping, and the second ball enters the second limiting slot of the second shaft body to implement clamping, to maintain the first rotating part and the second rotating part in the flattened state. When the first ball and the second ball respectively enter the first limiting slot and the second limiting slot, the elastic part provides thrust force for the first ball and the second ball, to push the first ball and the second ball respectively into the first limiting slot and the second limiting slot. In this process, the user can clearly perceive a force change, to obtain information that the first rotating part and the second rotating part are in the flattened state, thereby improving user experience.

In an implementation, a third limiting slot spaced from the first limiting slot is further disposed in a rotation direction of the first shaft body, and a fourth limiting slot spaced from the second limiting slot is further disposed in a rotation direction of the second shaft body. It may be understood that the rotation direction of the first shaft body is a rotation direction around the axis of the first shaft body, and the rotation direction of the second shaft body is a rotation direction around the axis of the second shaft body. When the first rotating part and the second rotating part are folded, the first ball is located in the third limiting slot, and the second ball is located in the fourth limiting slot. Clamping is implemented between the first ball and the third limiting slot, and clamping is implemented between the second ball and the fourth limiting slot. In this way, when the first rotating part and the second rotating part are folded, clamping is implemented for the first rotating part and the second rotating part. Therefore, the first rotating part and the second rotating part are in a folded state, to facilitate storage for the user and improve user experience.

In an implementation, the main shaft component further includes a first synchronizing gear and a second synchronizing gear that are engaged with each other. A first rotating gear and a second rotating gear are respectively disposed at opposite ends of the first rotating part and the second rotating part. The first synchronizing gear and the first rotating gear are engaged with each other. The second synchronizing gear and the second rotating gear are engaged with each other. The first synchronizing gear and the second synchronizing gear are disposed between the first rotating part and the second rotating part to implement synchronous rotation between the first rotating part and the second rotating part. Relative rotation between the first rotating part and the second rotating part may be understood as follows: When the first rotating part rotates relative to the second rotating part, the second rotating part also rotates relative to the first rotating part; and when the first rotating part rotates opposite to the second rotating part, the second rotating part also rotates opposite to the first rotating part. Certainly, in another embodiment, the first rotating part and the second rotating part may be alternatively directly engaged and connected.

In an implementation, the first shaft body is disposed at an axial end of the first rotating gear, and the second shaft body is disposed at an axial end of the second rotating gear. It may be understood that axial directions of the first rotating gear and the second rotating gear are respectively a direction in which an axis of the first rotating gear extends and a direction in which an axis of the second rotating gear extends. The axis of the first rotating gear is collinear with the axis of the first shaft body, and the axis of the second rotating gear is collinear with the axis of the second shaft body. The first shaft body and the second shaft body are respectively disposed at the axial ends of the first rotating gear and the second rotating gear, so that the first shaft body and the second shaft body respectively rotate with rotation of the first rotating part and the second rotating part.

In an implementation, the first shaft body is disposed on each of two sides of the first rotating part in a direction perpendicular to a first axis, and the second shaft body is disposed on each of two sides of the second rotating part in a direction perpendicular to a second axis. The damping component is disposed between the first shaft body and the second shaft body on the same side. The first axis is an axis around which the first rotating part rotates. The first axis is also the axis of the first rotating gear. The second axis is an axis around which the second rotating part rotates. The second axis is also the axis of the second rotating gear. In other words, there are two first shaft bodies and two second shaft bodies. The two first shaft bodies are respectively disposed on the two sides of the first rotating gear, and the two second shaft bodies are respectively disposed on the two sides of the second rotating gear. The two first shaft bodies are disposed opposite to the two second shaft bodies. The damping component is disposed between the first shaft body and the second shaft body on the same side. The first shaft bodies are respectively disposed on the two sides of the first rotating gear, and the second shaft bodies are respectively disposed on the two sides of the second rotating gear. In this way, the damping component disposed between the first shaft body and the second shaft body disposed opposite to the first shaft body maintains force balance on two sides of the first rotating gear and the second rotating gear. Certainly, in another embodiment, there may be alternatively one first shaft body and one second shaft body.

In an implementation, a plurality of spaced first limiting slots are disposed in an extension direction of the first shaft body, and a plurality of spaced second limiting slots are disposed in an extension direction of the second shaft body. The plurality of damping groups are spaced and disposed corresponding to distribution positions of the plurality of first limiting slots and the plurality of second limiting slots.

It may be understood that the plurality of damping groups are disposed between the first shaft body and the second shaft body to provide enough force to implement effective clamping of the first rotating part and the second rotating part.

In an implementation, the damping component further includes a positioning part. The positioning part is disposed between the first ball and the elastic part. The positioning part includes a first positioning slot. The first ball is partially accommodated in the first positioning slot. The first end of the elastic part is connected to a surface that is of the positioning part and that is opposite to the first positioning slot. In other words, the positioning part is configured to position the first ball and the elastic part. To be specific, the positioning part has a function of ensuring relative alignment between the first ball and the elastic part and ensuring that the elastic part can provide enough elastic force for the first ball, so that the first ball rolls from the circumferential surface of the first shaft body into the first limiting slot to implement clamping, or rolls out of the first limiting slot to implement relative rotation between the first rotating part and the second rotating part.

In an implementation, the positioning part includes a positioning cradle. The positioning cradle is disposed on the surface that is of the positioning part and that is opposite to the first positioning slot. The positioning cradle extends into the first end of the elastic part. The positioning cradle is configured to position the elastic part, to prevent the elastic part from being inclined and to ensure that the elastic part can provide enough elastic force for the first ball. In this way, the first ball rolls from the circumferential surface of the first shaft body into the first limiting slot to implement clamping.

In an implementation, the main shaft component further includes a pair of clamping parts. The pair of clamping parts are disposed on two sides of the damping groups, to fasten the positioning part. The positioning part further includes a second positioning slot. The second positioning slot and the first positioning slot are respectively located on two opposite surfaces of the positioning part. The second positioning slot is connected to the first positioning slot. The first end of the elastic part is located in the second positioning slot and abuts against the first ball. When the elastic part is elastically deformed, the elastic part and the first ball move relative to the positioning part. The second positioning slot is configured to limit the elastic part, to prevent the elastic part from being inclined and ensure that the elastic part can provide enough elastic force for the first ball. The positioning part is only configured to maintain relative alignment between the elastic part and the first ball. A position of the positioning part does not change when the elastic part is deformed.

In an implementation, the positioning part further includes a second positioning slot. The second positioning slot and the first positioning slot are respectively located on two opposite surfaces of the positioning part. The elastic part is partially accommodated in the second positioning slot. The elastic force of the elastic part is passed to the first ball by using the positioning part. In other words, the positioning part is configured to: not only maintain relative alignment between the elastic part and the first ball, but also pass force between the elastic part and the first ball. The second positioning slot is configured to limit the first end of the elastic part in cooperation with the positioning cradle, to prevent the elastic part from being inclined and ensure that the elastic part can provide enough elastic force for the first ball.

In an implementation, the main shaft component further includes a pair of clamping parts. The pair of clamping parts are disposed on two sides of the damping groups. The clamping part includes a sliding slot. Two sides of the positioning part include sliding blocks. The sliding block is located in the sliding slot. When the elastic part is elastically deformed, the sliding block slides in the sliding slot. Because elastic deformation of the elastic part when the first ball enters the first limiting slot is different from elastic deformation of the elastic part when the first ball abuts against the circumferential surface of the first shaft body, the positioning part located between the elastic part and the first ball is located in different positions because of different elastic deformation of the elastic part. The clamping part is configured to clamp the positioning part. The sliding slot provides specific displacement space of the positioning part, to ensure that the positioning part remains balanced in a sliding process and implement good clamping of the first rotating part and the second rotating part.

In an implementation, two ends of the clamping part are respectively connected to the first shaft body and the second shaft body, and the first shaft body and the second shaft body can rotate relative to the clamping part. In other words, the clamping part is connected between the first shaft body and the second shaft body to implement limiting. Certainly, in another embodiment, the clamping part may further be connected to another component of the rotating shaft structure to implement limiting.

In an implementation, the first ball is fastened in the first positioning slot, that is, the first ball cannot roll in the first positioning slot.

In an implementation, the first ball can roll in the first positioning slot. In this way, when the first ball rolls relative to the circumferential surface of the first shaft body, the first ball rolls relative to the circumferential surface of the first shaft body, and the first ball also rolls itself. In this case, when the first ball rolls relative to the circumferential surface of the first shaft body, positions in which the first ball is in contact with the circumferential surface of the first shaft body are different in different positions of the circumferential surface of the first shaft body. In this way, the first ball rolls more smoothly on the circumferential surface of the first shaft body. In addition, the following case is avoided: The first ball is deformed because a part of the first ball is worn in a rolling process, thereby effectively improving service life of the damping component.

In an implementation, the positioning part includes a bearer part. The bearer part is configured to bear a part that is of the first ball and that is exposed from the first positioning slot, to keep the first ball to be aligned with the elastic part, so that the first ball is mounted between the first shaft body and the second shaft body.

In an implementation, the damping component includes a guide sleeve. The guide sleeve is provided with a through hole. The elastic part is located in the guide sleeve. The first end abuts against the first ball partially located in the through hole. In other words, the guide sleeve is configured to position the first ball and the elastic part. To be specific, the guide sleeve has a function of ensuring relative alignment between the first ball and the elastic part and ensuring that the elastic part can provide enough elastic force for the first ball, so that the first ball rolls from the circumferential surface of the first shaft body into the first limiting slot to implement clamping, or rolls out of the first limiting slot to implement relative rotation between the first rotating part and the second rotating part.

In an implementation, the rotating shaft structure includes an accommodation part. The accommodation part includes an upper cover and a lower cover. The upper cover and the lower cover are engaged with each other. The main shaft component and the damping component are accommodated between the upper cover and the lower cover. The upper cover and the lower cover have a function of accommodating the foregoing components, to ensure a clear appearance of the rotating shaft structure. In addition, the upper cover and the lower cover are further used to clamp and fasten the related components accommodated in accommodation space between the upper cover and the lower cover, to ensure assembly and connection of the related components in the accommodation space.

The electronic device in this disclosure includes a first enclosure, a second enclosure, a flexible screen, and the foregoing rotating shaft structure. The first enclosure and the second enclosure are located on two sides of the rotating shaft structure. The first enclosure is connected to the first shaft body. The second enclosure is connected to the second shaft body. The flexible screen is disposed on the first enclosure, the rotating shaft structure, and the second enclosure. The electronic device having the foregoing rotating shaft structure can remain in a flattened state or a folded state. As such, the electronic device operates more smoothly when being folded or flattened, and is friction-resistant with a long service life, thereby improving a rotation experience of the electronic device and a user experience.

In this disclosure, the damping component is disposed between the circumferential surface of the first shaft body and the circumferential surface of the second shaft body in the rotating shaft structure, so that the first ball of the damping group is located at the first end of the elastic part of the damping group. The first ball abuts against the circumferential surface of the first shaft body by using the elastic force of the elastic part. In the rotation process of the first shaft body, the first ball rolls relative to the circumferential surface of the first shaft body and can be positioned in the first limiting slot, to implement clamping of the rotating shaft structure and maintain the rotating shaft structure in the flattened state. Because the first ball is spherical, in the rotation process of the first shaft body, the contact area between the first ball and each of the circumferential surface of the first shaft body and the first limiting slot is small. In this case, friction is small. In this way, the first ball rolls more smoothly on the circumferential surface of the first shaft body and the first limiting slot, to improve folding and unfolding experience of the rotating shaft structure.

DESCRIPTION OF EMBODIMENTS

The following describes the embodiments of this disclosure with reference to the accompanying drawings in the embodiments of this disclosure.

An embodiment of this disclosure provides an electronic device. The electronic device includes but is not limited to a mobile phone, a tablet computer, a notebook computer, an electronic reader, a wearable device, a vehicle-mounted device, and the like. The electronic device may be folded and flattened. An example in which the electronic device is a foldable mobile phone is used for specific description in this disclosure.

Figure 1:
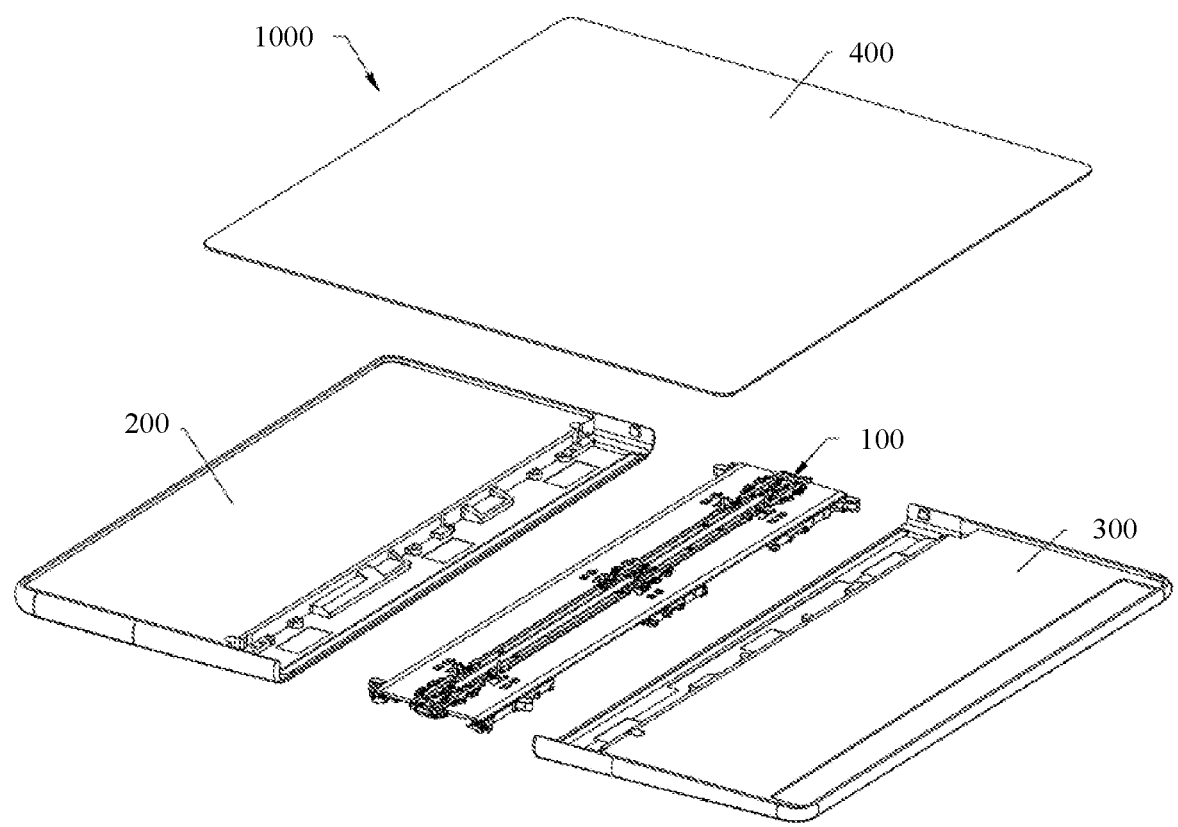
FIG. 1 is a schematic structural diagram of an electronic device according to an embodiment of this disclosure.

FIG. 1 is a schematic structural diagram of an electronic device according to an embodiment of this disclosure. The electronic device 1000 includes a rotating shaft structure 100, a first enclosure 200, a second enclosure 300, and a flexible screen 400. Two opposite sides of the rotating shaft structure 100 are respectively connected to the first enclosure 200 and the second enclosure 300, so that the first enclosure 200 and the second enclosure 300 rotate relative to or rotate opposite to each other by using the rotating shaft structure 100. The flexible screen 400 is disposed on the first enclosure 200, the rotating shaft structure 100, and the second enclosure 300. The flexible screen 400 can be used to display information and provide an interaction interface for a user. The flexible screen 400 may be fastened to the first enclosure 200, the rotating shaft structure 100, and the second enclosure 300 in a glue dispensing manner or the like. The first enclosure 200 and the second enclosure 300 may respectively form mounting space, to install electronic components such as a circuit board, a battery, a receiver, a loudspeaker, and a camera of the electronic device 1000. The circuit board may integrate electronic components such as a main controller, a storage unit, an antenna module, and a power management module of the electronic device 1000. The battery may supply power to the electronic components such as the flexible screen 400, the circuit board, the receiver, the loudspeaker, and the camera.

Figure 2:
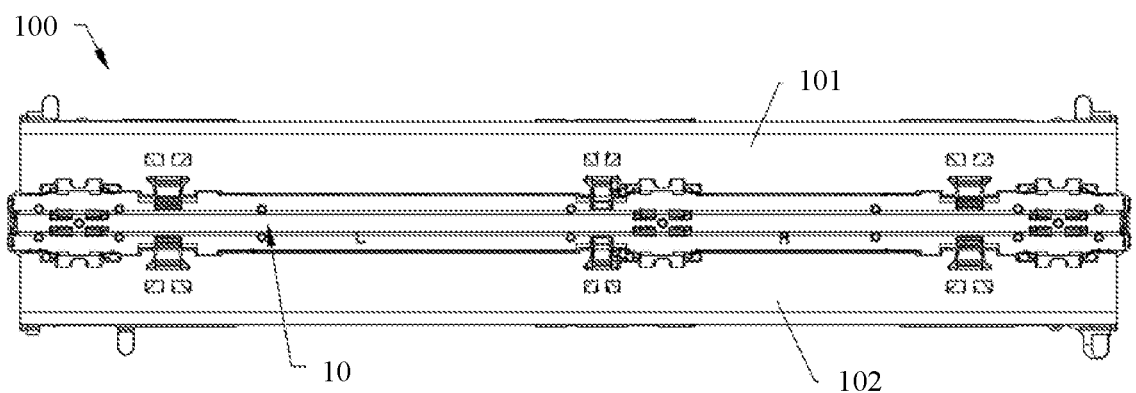
FIG. 2 is a schematic structural diagram of a rotating shaft structure of the electronic device shown in FIG. 1.
Figure 3:
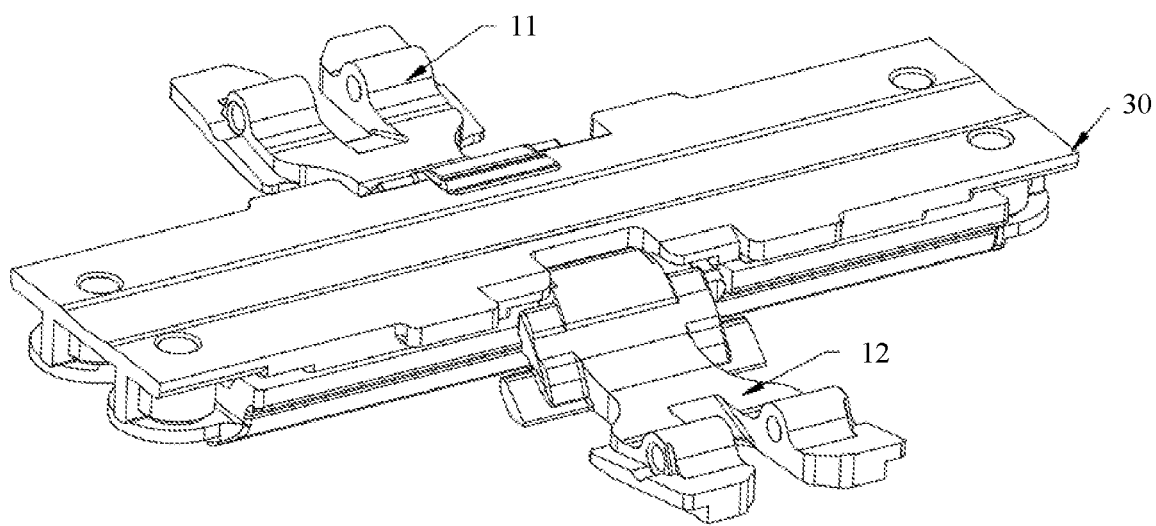
FIG. 3 is a schematic diagram of a partial structure of the rotating shaft structure shown in FIG. 2.

FIG. 2 is a schematic structural diagram of a rotating shaft structure 100 of the electronic device 1000 shown in FIG. 1. FIG. 3 is a schematic diagram of a partial structure of the rotating shaft structure 100 shown in FIG. 2. The electronic device 1000 is switched between a flattened state and a folded state by using the rotating shaft structure 100. The rotating shaft structure 100 includes a first connection part 101, a second connection part 102, a main shaft component 10, a first rotating part 11, and a second rotating part 12. The main shaft component 10 serves as a shaft and also a support part. The first rotating part 11 and the second rotating part 12 are respectively located on two sides of the main shaft component 10. The first rotating part 11 and the second rotating part 12 can rotate relative to each other. The first connection part 101 and the second connection part 102 are respectively fastened to the first rotating part 11 and the second rotating part 12, and rotate relative to or rotate opposite to each other by using the first rotating part 11 and the second rotating part 12. The first enclosure 200 is fastened to the first connection part 101. The second enclosure 300 is fastened to the second connection part 102. In some cases, the first connection part 101 and the first enclosure 200 may be alternatively integrally formed, and the second connection part 102 and the second enclosure 300 may be alternatively integrally formed. In other words, the first connection part 101 may be understood as a part of the first enclosure 200, and the second connection part 102 may be understood as a part of the second enclosure 300.

The electronic device 1000 is in the folded state when the first enclosure 200 and the second enclosure 300 rotate relative to each other to be overlapped (overlapping indicates that side parts can fit without a gap therebetween, or side parts are opposite to each other with a gap therebetween). On the contrary, the electronic device 1000 is in the flattened state when the first enclosure 200 and the second enclosure 300 rotate opposite to each other to limit positions (that is, the first enclosure 200 and the second enclosure 300 are flattened when the two can no longer rotate opposite to each other) from an overlapped state. When the electronic device 1000 is fully flattened, the flexible screen 400 is flattened. In this case, the electronic device 1000 has a large screen display effect. In the folded state, the first enclosure 200 overlaps the second enclosure 300, and the flexible screen 400 is sandwiched between the first enclosure 200 and the second enclosure 300. The rotating shaft structure 100 can remain in the flattened state or the folded state. The rotating shaft structure 100 is more smooth when being folded or flattened, and is friction-resistant with long service life, thereby improving rotation experience of the rotating shaft structure 100 and user experience.

Figure 4:
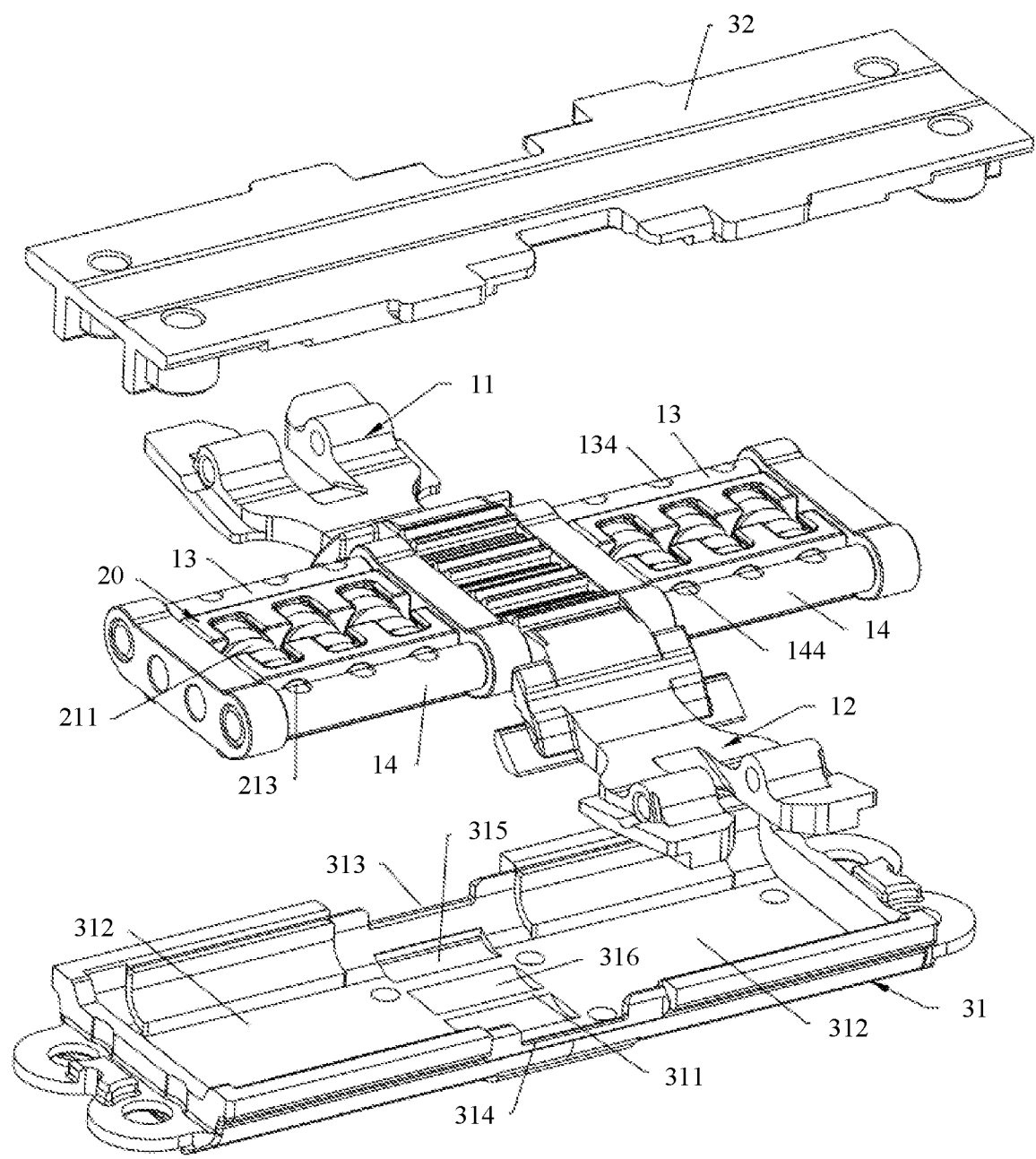
FIG. 4 is a schematic exploded view of a structure of the rotating shaft structure shown in FIG. 3.
Figure 5:
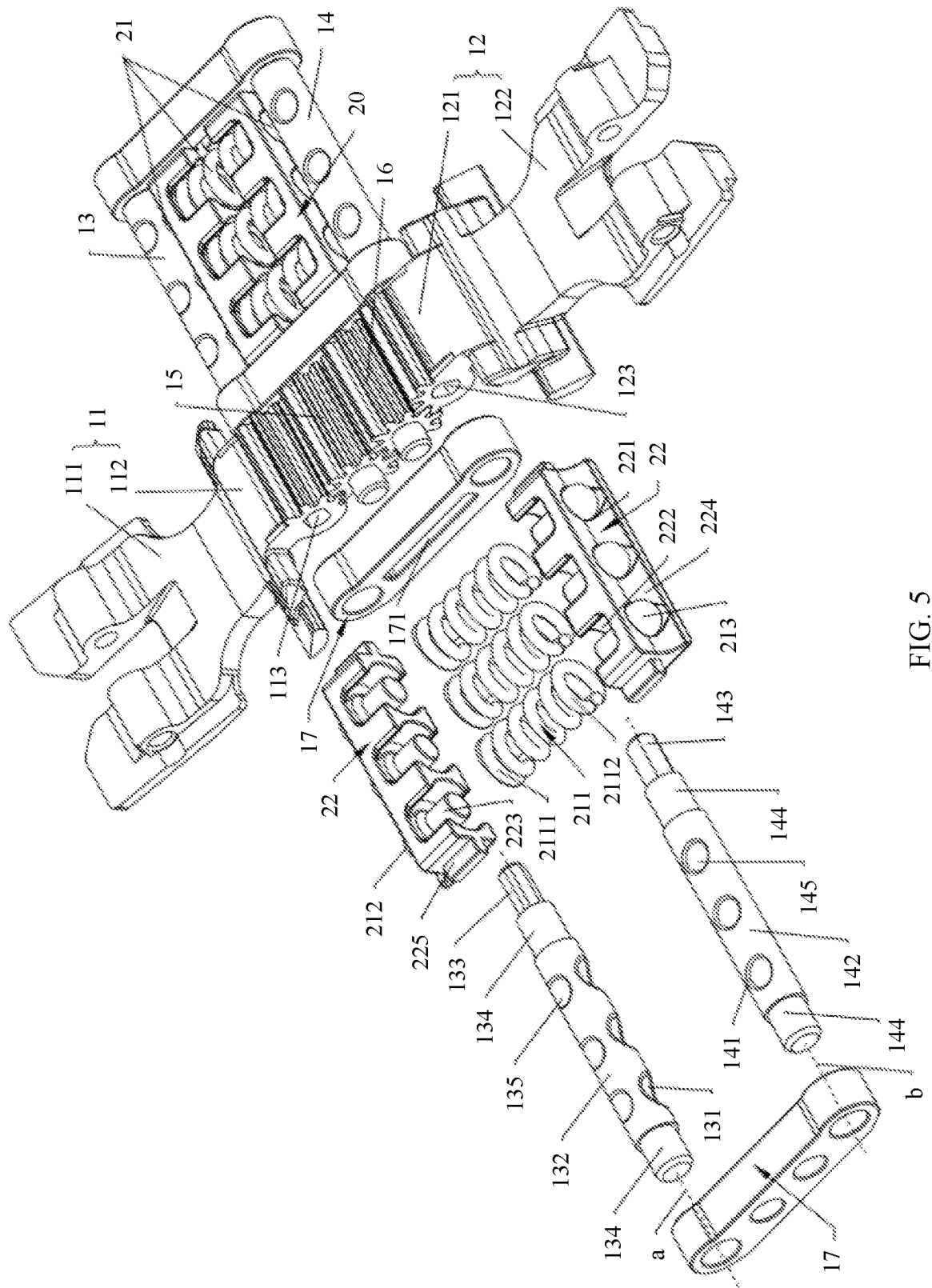
FIG. 5 is a schematic exploded view of a partial structure of the rotating shaft structure shown in FIG. 4.

FIG. 4 is a schematic exploded view of a structure of the rotating shaft structure shown in FIG. 3. FIG. 5 is a schematic exploded view of a partial structure of the rotating shaft structure shown in FIG. 4. In this embodiment of this disclosure, the rotating shaft structure 100 further includes a damping component 20. In specific settings, the damping component 20 may be disposed in the main shaft component 10. Specifically, the main shaft component 10 may include a first shaft body 13 and a second shaft body 14. The first shaft body 13 includes a circumferential surface. The circumferential surface of the first shaft 13 is a surface obtained through rotating the first shaft body 13 around an axis a of the first shaft body 13. The second shaft body 14 includes a circumferential surface. The circumferential surface of the second shaft body 14 is a surface obtained through rotating the second shaft body 14 around an axis b of the second shaft body 14. In a scenario shown in FIG. 4, the circumferential surface of the first shaft body 13 and the circumferential surface of the second shaft body 14 are arc surfaces. In another implementation scenario, the circumferential surface of the first shaft body 13 and the circumferential surface of the second shaft body 14 may be alternatively non-arc surfaces. The first shaft body 13 is fastened to the first rotating part 11. The second shaft body 14 is fastened to the second rotating part 12. The first shaft body 13 and the second shaft body 14 are spaced and disposed opposite to each other, and respectively rotate with rotation of the first rotating part 11 and the second rotating part 12. A first limiting slot 131 is disposed on the circumferential surface of the first shaft body 13, and a second limiting slot 141 is disposed on the circumferential surface of the second shaft body 14. The damping component 20 is located between the circumferential surface of the first shaft body 13 and the circumferential surface of the second shaft body 14. The damping component 20 may include at least one damping group 21. In a possible implementation scenario, as shown in FIG. 4 and FIG. 5, each damping group 21 may include an elastic part 211, a first ball 212, and a second ball 213. The first ball 212 is located at a first end 2111 of the elastic part 211. The first ball 212 abuts against the circumferential surface of the first shaft body 13 by using elastic force of the elastic part 211. A second end 2112 that is of the elastic part 211 and that is opposite to the first end 2111 is elastically connected to the circumferential surface of the second shaft body 14 by using the second ball 213. In other words, the second ball 213 is located at the second end 2112 of the elastic part 211. The second ball 213 abuts against the circumferential surface of the second shaft body 14 by using the elastic force of the elastic part 211. FIG. 4 and FIG. 5 show a position relationship between the damping group 21 and each of the first shaft body 13 and the second shaft body 14 of the electronic device 1000 in the flattened state. In a rotation process of the first shaft body 13 and the second shaft body 14, the first ball 212 rolls relative to the circumferential surface of the first shaft body 13 and can be positioned in the first limiting slot 131, and the second ball 213 rolls relative to the circumferential surface of the second shaft body 14 and can be positioned in the second limiting slot 141, so that the first rotating part 11 and the second rotating part 12 are in the flattened state.

In another possible implementation scenario, the damping group 21 may include an elastic part 211 and a first ball 212. In a possible implementation of this embodiment scenario, the second shaft body 13 may rotate with the second rotating part 13. This implementation has the same principle as the implementation in which the damping group 21 includes the elastic part 211, the first ball 212, and the second ball 213. Specifically, the first ball 212 is located at a first end 2111 of the elastic part 211. The first ball 212 abuts against the circumferential surface of the first shaft body 13 by using elastic force of the elastic part 211. A second end 2112 of the elastic part 211 directly abuts against the second shaft body 14. When the first shaft body 13 and the second shaft body 14 rotate, the first ball 212 rolls relative to the circumferential surface of the first shaft body 13 and can be positioned in a first limiting slot 131, and the second end 2112 may slide relative to the circumferential surface of the second shaft body 14. In another possible implementation of this embodiment scenario, the second shaft body 14 may not rotate with the second rotating part 12. This implementation has a different principle from the implementation in which the damping group 21 includes the elastic part 211, the first ball 212, and the second ball 213. Specifically, when the first shaft body 13 rotates and the second shaft body 14 does not rotate, the first ball 212 rolls relative to the circumferential surface of the first shaft body 13 and can be positioned in the first limiting slot 131, and the second end 2112 is directly fastened to the second shaft body 14. When the second shaft body does not rotate, the second shaft body may be understood as a part of an enclosure, and an end that is of the elastic part 211 and that is opposite to the first ball 212 is fastened to an enclosure of the rotating shaft structure 100.

It may be understood that, in an implementation scenario of a damping group including two balls and an implementation scenario of a damping group including one ball, a movement principle and a connection relationship between each ball and the first shaft body 13 or the second shaft body 14 are similar in the two implementations. Therefore, the following is described by using an example in which the damping group 21 includes the elastic part 211, the first ball 212, and the second ball 213.

In this embodiment of this disclosure, clamping is implemented between the first ball 212 and the first limiting slot 131, and clamping is implemented between the second ball 213 and the second limiting slot 141. In this way, when the first rotating part 11 and the second rotating part 12 are flattened, clamping is implemented on the first rotating part 11 and the second rotating part 12, so that the first rotating part 11 and the second rotating part 12 are in the flattened state, to improve user experience.

Figure 6:
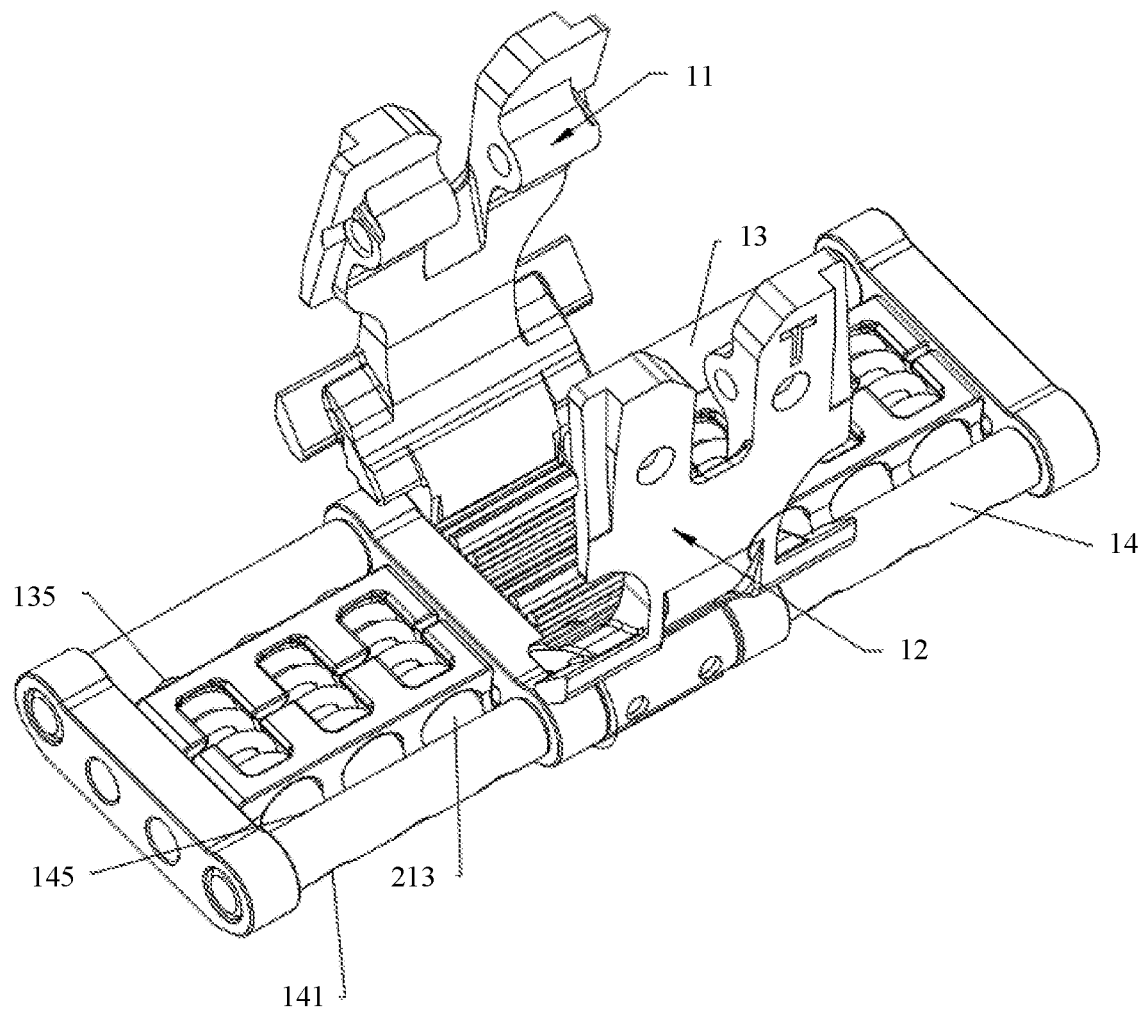
FIG. 6 is a schematic structural diagram of a folded state of the rotating shaft structure shown in FIG. 4.

With reference to FIG. 5 and FIG. 6, FIG. 6 is a schematic structural diagram of a folded state of the rotating shaft structure 100 shown in FIG. 4. In this embodiment of this disclosure, the first shaft body 13 may further include a third limiting slot 135. The third limiting slot 135 and the first limiting slot 131 are spaced in a rotation direction of the first shaft body 13. The second shaft body 14 includes a fourth limiting slot 145. The fourth limiting slot 145 and the second limiting slot 141 are spaced in a rotation direction of the second shaft body 14. It may be understood that the rotation direction of the first shaft body 13 is the direction in which the first shaft body 13 rotates around the axis a, and the rotation direction of the second shaft body 14 is the direction in which the second shaft body 14 rotates around the axis b. When the first rotating part 11 and the second rotating part 12 are folded, the first ball 212 is located in the third limiting slot 135, and the second ball 213 is located in the fourth limiting slot 145. Clamping is implemented between the first ball 212 and the third limiting slot 135, and clamping is implemented between the second ball 213 and the fourth limiting slot 145. In this way, when the first rotating part 11 and the second rotating part 12 are flattened, clamping is implemented on the first rotating part 11 and the second rotating part 12, so that the first rotating part 11 and the second rotating part 12 are in the flattened state, to facilitate storage for the user and improve user experience.

In a possible implementation of this embodiment of this disclosure, the first limiting slot 131, the second limiting slot 141, the third limiting slot 135, and the fourth limiting slot 145 are all spherical slots, specifically, ½ spherical slots, to separately adapt to the first ball 212 and the second ball 213. In this way, the ball better rolls in and rolls out of the limiting slot, so that clamping of the rotating shaft structure 100 is more smooth, to improve user experience.

In another possible implementation of this embodiment of this disclosure, the first limiting slot 131, the second limiting slot 141, the third limiting slot 135, and the fourth limiting slot 145 may be ¾ or ¼ spherical slots, or the like. Shapes of the first limiting slot 131, the second limiting slot 141, the third limiting slot 135, and the fourth limiting slot 145 may be other shapes of slots such as a cylindrical slot. Shapes of the first limiting slot 131, the second limiting slot 141, the third limiting slot 135, and the fourth limiting slot 145 are the same or different.

In this embodiment of this disclosure, the elastic part 211 is a spring or another elastic component other than the spring. The first ball 212 and the second ball 213 are both balls of steel or another material other than steel. The first ball 212, the second ball 213, and the elastic part 211 are simple in structure and easy to process.

When the first shaft body 13 has both the first limiting slot 131 and the third limiting slot 135, and the second shaft body 14 has both the second limiting slot 141 and the fourth limiting slot 145, when the electronic device 1000 is switched from the folded state to the flattened state, the first enclosure 200 drives the first rotating part 11 to rotate opposite to the second enclosure 300, and the first rotating part 11 drives the first shaft body 13 to synchronously rotate. The second enclosure 300 drives the second rotating part 12 to rotate opposite to the first enclosure 200, and the second rotating part 12 drives the second shaft body 14 to synchronously rotate. In addition, the third limiting slot 135 rotates with the first shaft body 13 towards a position away from the first ball 212 until the first ball 212 rolls out of the third limiting slot 135 and faces the first limiting slot 131. The first ball 212 enters the first limiting slot 131 under push of the elastic part 211 to implement clamping. The fourth limiting slot 145 rotates with the second shaft body 14 back towards a position away from the second ball 213 until the second ball 213 rolls out of the fourth limiting slot 145 and faces the second limiting slot 141. The second ball 213 enters the second limiting slot 141 under push of the elastic part 211 to implement clamping. In other words, two opposite ends of the elastic part 211 abut between the first shaft body 13 and the second shaft body 14 by using the balls. When the first rotating part 11 and the second rotating part 12 are flattened relative to each other, the first rotating part 11 and the second rotating part 12 respectively implement clamping by using the first shaft body 13 and the second shaft body 14, to ensure balanced force bearing between the first rotating part 11 and the second rotating part 12 and ensure stronger clamping of the first rotating part 11 and the second rotating part 12, thereby improving user experience. When the first ball 212 and the first limiting slot 131 are partially aligned, and the second ball 213 and the second limiting slot 141 are partially aligned, the first ball 212 and the second ball 213 respectively automatically enter the first limiting slot 131 and the second limiting slot 141 under thrust force of the elastic part 211, so that the first enclosure 200 and the second enclosure 300 are flattened relative to each other. In this way, the first enclosure 200 and the second enclosure 300 reach an automatically flattened effect to some extent.

When the electronic device 1000 is switched from the flattened state to the folded state, the first enclosure 200 drives the first rotating part 11 to rotate relative to the second enclosure 300, and the first rotating part 11 drives the first shaft body 13 to synchronously rotate. The second enclosure 300 drives the second rotating part 12 to rotate relative to the first enclosure 200, and the second rotating part 12 drives the second shaft body 14 to synchronously rotate. In addition, the first limiting slot 131 rotates with the first shaft body 13 towards a position away from the first ball 212 until the first ball 212 rolls out of the first limiting slot 131 and faces the third limiting slot 135. The first ball 212 enters the third limiting slot 135 under push of the elastic part 211 to implement clamping. The second limiting slot 141 rotates with the second shaft body 14 towards a position away from the second ball 213 until the second ball 213 rolls out of the second limiting slot 141 and faces the fourth limiting slot 145. The second ball 213 enters the fourth limiting slot 145 under push of the elastic part 211 to implement clamping. The electronic device 1000 is switched to the folded state. In other words, when the first rotating part 11 and the second rotating part 12 are folded relative to each other, the first rotating part 11 and the second rotating part 12 respectively implement clamping by using the first shaft body 13 and the second shaft body 14, to ensure balanced force bearing between the first rotating part 11 and the second rotating part 12 and ensure stronger clamping of the first rotating part 11 and the second rotating part 12, thereby improving user experience. When the first ball 212 and the third limiting slot 135 are partially aligned, and the second ball 213 and the fourth limiting slot are partially aligned, the first ball 212 and the second ball 213 respectively automatically enter the third limiting slot 135 and the fourth limiting slot 145 under the thrust force of the elastic part 211, so that the first enclosure 200 and the second enclosure 300 are folded relative to each other. In this way, the first enclosure 200 and the second enclosure 300 reach an automatically folded effect to some extent.

Certainly, in another embodiment, the first shaft body 13 and the second shaft body 14 may further be provided with a plurality of limiting slots in the rotation directions of the first shaft body 13 and the second shaft body 14, so that the rotating shaft structure 100 can also implement clamping in a bent state or a state between the folded state and the flattened state. For example, clamping can be implemented when an angle between the first rotating part 11 and the second rotating part 12 is 15 degrees, 45 degrees, 75 degrees, or 135 degrees.

In a possible implementation of this embodiment of this disclosure, the first shaft body 13 may have only the first limiting slot 131, and/or the second shaft body 14 may have only the second limiting slot 141. Clamping is implemented by using another structure when the rotating shaft structure 100 is in the folded state.

In the rotating shaft structure 100 in this disclosure, the first shaft body 13 is disposed on the first rotating part 11, the second shaft body 14 is disposed on the second rotating part 12, and the damping component 20 is disposed between the circumferential surface of the first shaft body 13 and the circumferential surface of the second shaft body 14. In this way, the damping group 21 implements clamping of the rotating shaft structure 100, so that the rotating shaft structure 100 remains in the folded state or the flattened state. Specifically, when the first rotating part 11 and the second rotating part 12 are flattened relative to each other, the first ball 212 enters the first limiting slot 131 of the first shaft body 13 to implement clamping, and the second ball 213 enters the second limiting slot 141 of the second shaft body 14 to implement clamping. When the first rotating part 11 and the second rotating part 12 are folded relative to each other, the first ball 212 enters the third limiting slot 135 of the first shaft body 13 to implement clamping, and the second ball 213 enters the fourth limiting slot 145 of the second shaft body 14 to implement clamping. In this way, the first rotating part 11 and the second rotating part 12 remain in the flattened state or the folded state. The first ball 212 and the second ball 213 are spherical. In the rotation process of the first shaft body 13 and the second shaft body 14, a contact area between the first ball 212 and each of the circumferential surface of the first shaft body 13, the first limiting slot 131, and the third limiting slot 135 is small, and a contact area between the second ball 213 and each of the circumferential surface of the second shaft body 14, the second limiting slot 141, and the fourth limiting slot 145 is small. In this case, friction is small. Therefore, the first ball 212 rolls more smoothly on the circumferential surface of the first shaft body 13, the first limiting slot 131, and the third limiting slot 135, and the second ball 213 rolls more smoothly on the circumferential surface of the second shaft body 14, the second limiting slot 141, and the fourth limiting slot 145, to improve folded and flattened experience of the rotating shaft structure 100. In addition, in the rotation process of the first rotating part 11 and the second rotating part 12, rolling abrasion between the first ball 212 and each of the circumferential surface of the first shaft body 13, the first limiting slot 131, and the third limiting slot 135 and rolling abrasion between the second ball 213 and each of the circumferential surface of the second shaft body 14, the second limiting slot 141, and the fourth limiting slot 145 are small, thereby effectively improving service life of the damping component 20. In addition, when the first ball 212 enters the first limiting slot 131 or the third limiting slot 135, and the second ball 213 enters the second limiting slot 141 or the fourth limiting slot 145, the elastic part 211 provides the thrust force for the first ball 212 and the second ball 213, to push the first ball 212 into the first limiting slot 131 or the third limiting slot 135 and push the second ball 213 into the second limiting slot 141 or the fourth limiting slot 145. In this process, the user can clearly perceive a force change to obtain information that the rotating shaft structure 100 is in the flattened state or the folded state, that is, information that the first rotating part 11 and the second rotating part 12 are in the flattened state or the folded state, to improve user experience.

As shown in FIG. 4, the rotating shaft structure 100 may further include an accommodation part 30. The accommodation part 30 may include a lower cover 31 and an upper cover 32. The upper cover 31 and the lower cover 32 are engaged with each other. The main shaft component 10 and the damping component 20 are accommodated between the lower cover 31 and the upper cover 32. Specifically, the lower cover 31 includes a middle part 311 and a side part 312. The side part 312 is located on two sides of the middle part 311. The first rotating part 11 and the second rotating part 12 can be partially accommodated in the middle part 311. The damping component 20, the first shaft body 13, the second shaft body 14, and the like are located in the side part 312. The upper cover 32 and the lower cover 31 have a function of accommodating the foregoing components, to ensure a clear appearance of the rotating shaft structure 100. In addition, the upper cover 32 and the lower cover 31 are further used to clamp and fasten related components accommodated in the accommodation part 30, to ensure assembly and connection of the related components in the accommodation part 30.

The lower cover 31 may include a first clamping groove 313, a second clamping groove 314, a first avoidance slot 315, and a second avoidance slot 316 that are located in the middle part 311. The first avoidance slot 313 and the second clamping groove 314 are disposed opposite to each other on two sides of the lower cover 31. There are two first avoidance slots 315 that are located between the first clamping groove 313 and the second clamping groove 314 and that are respectively close to the first clamping groove 313 and the second clamping groove 314. The second avoidance slot 316 is located between the two first avoidance slots 315. The first rotating part 11 is partially located in the first clamping groove 313 and extends into the first avoidance slot 315. The first rotating part 11 is pressed by the upper cover 32 to be limited between the upper cover 32 and the lower cover 31. The second rotating part 12 is partially located in the second clamping groove 314 and extends into the second avoidance slot 316. The second rotating part 12 is pressed by the upper cover 32 to be limited between the upper cover 32 and the lower cover 31. In other words, the first avoidance slot 315 is configured to partially avoid the first rotating part 11 and the second rotating part 12, so that the first rotating part 11 and the second rotating part 12 can flexibly rotate relative to each other. The second avoidance slot 316 is configured to avoid another rotating component. In this embodiment of this disclosure, the upper cover 32 and the lower cover 31 are fastened and connected by using screws, or may be connected in another connection manner, for example, a clamping manner, a welding manner, and an adhesive manner.

As shown in FIG. 4 and FIG. 5, the first rotating part 11 may include a first connection part 111 and a first rotating gear 112. A first mounting hole 113 is disposed on each of two ends of an axial direction of the first rotating gear 112. The first shaft body 13 may be fastened to the first mounting hole 113. The first connection part 111 is located outside the accommodation part 30 and connected to the first connection part 101. A part of the first rotating part 11 connecting the first connection part 111 and the first rotating gear 112 is clamped in the first clamping groove 313. The first rotating gear 112 is located in the first avoidance slot 315 corresponding to the first rotating gear 112. The second rotating part 12 may include a second connection part 121 and a second rotating gear 122 that are connected to each other. The first rotating gear 112 and the second rotating gear 122 are respectively disposed on opposite ends of the first rotating part 11 and the second rotating part 12. A second mounting hole 123 is disposed on each of two ends of an axial direction of the second rotating gear 122. The second shaft body 14 may be fastened to the second mounting hole 123. The second connection part 121 is located outside the accommodation part 30 and connected to the second connection part 102. A part of the second rotating part 12 connecting the second connection part 121 and the second rotating gear 122 is clamped in the second clamping groove 314. The second rotating gear 122 is located in the first avoidance slot 315 corresponding to the second rotating gear 122. It may be understood that the axial directions of the first rotating gear 112 and the second rotating gear 122 are respectively a direction in which an axis of the first rotating gear 112 extends and a direction in which an axis of the second rotating gear 122 extends. The axis of the first rotating gear 112 is collinear with the axis a of the first shaft body 13, and the axis of the second rotating gear 122 is collinear with the axis b of the second shaft body 14.

In this embodiment of this disclosure, gear teeth of the first rotating gear 112 may be disposed on only a half circumference at which the first rotating gear 112 and the second rotating gear 122 are engaged with each other, and gear teeth of the second rotating gear 122 may be disposed on only a half circumference at which the second rotating gear 122 and the first rotating gear 112 are engaged with each other. When it is ensured that the first rotating part 11 and the second rotating part 12 are folded or flattened relative to each other, on this basis, a thickness of the first rotating part 11 and a thickness of the second rotating part 12 are reduced, thereby reducing a thickness of the rotating shaft structure 100 and facilitating miniaturization of the electronic device 1000. Certainly, in another embodiment, gear teeth of the first rotating gear 112 may be alternatively disposed on a circumferential edge other than a contact part at which the first rotating gear 112 and the second rotating gear 122 are engaged with each other, and gear teeth of the second rotating gear 122 may be alternatively disposed on a circumferential edge other than a contact part at which the second rotating gear 122 and the first rotating gear 112 are engaged with each other.

In a possible implementation scenario of this implementation, the first rotating gear 112 and the second rotating gear 122 are directly engaged and contacted. In another possible implementation scenario of this implementation, the first rotating gear 112 and the second rotating gear 122 are indirectly engaged and contacted. Specifically, the main shaft component 10 may further include a first synchronizing gear 15 and a second synchronizing gear 16 that are engaged with each other. The first synchronizing gear 15 and the second synchronizing gear 16 are located in the second avoidance slot 316. The first synchronizing gear 15 and the first rotating part 11 are engaged with each other, and the second synchronizing gear 16 and the second rotating part 12 are engaged with each other. Specifically, the first synchronizing gear 15 and the first rotating gear 112 are engaged with each other, and the second synchronizing gear 16 and the second rotating gear 122 are engaged with each other. The first rotating part 11 and the second rotating part 12 are connected to each other through rotation of the first rotating gear 112 and the second rotating gear 122. The first synchronizing gear 15 and the second synchronizing gear 16 are disposed between the first rotating part 11 and the second rotating part 12 to implement synchronous rotation between the first rotating part 11 and the second rotating part 12. Relative rotation between the first rotating part 11 and the second rotating part 12 may be understood as follows: When the first rotating part 11 rotates relative to the second rotating part 12, the second rotating part 12 also rotates relative to the first rotating part 11; and when the first rotating part 11 rotates opposite to the second rotating part 12, the second rotating part 12 also rotates opposite to the first rotating part 11.

In this embodiment of this disclosure, a direction of the elastic force of the elastic part 211 is perpendicular to the axial directions of the first rotating gear 112 and the second rotating gear 122. Certainly, in another embodiment, a direction of the elastic force of the elastic part 211 may be alternatively parallel to the axial directions of the first rotating gear 112 and the second rotating gear 122. The first shaft body 13 and the second shaft body 14 are also adaptively disposed, so that the elastic part 211 cooperates with the first ball 212 and the second ball 213 to implement clamping on the first rotating part 11 and the second rotating part 12 in the flattened state or in the folded state. However, the rotating shaft structure 100 can be better miniaturized when the direction of the elastic force of the elastic part 211 is perpendicular to the axial directions of the first rotating gear 112 and the second rotating gear 122 than when the direction of the elastic force of the elastic part 211 is parallel to the axial directions of the first rotating gear 112 and the second rotating gear 122. Clamping needs to be implemented by using torsion when the direction of the elastic force of the elastic part 211 is parallel to the axial directions of the first rotating gear 112 and the second rotating gear 122. In this case, a size of a component that cooperates with the first ball 212 and the second ball 213 needs to be set greater. However, clamping is implemented without torsion when the direction of the elastic force of the elastic part 211 is perpendicular to the axial directions of the first rotating gear 112 and the second rotating gear 122. Therefore, the first shaft body 13 and the second shaft body 14 may be set smaller, to save space and facilitate miniaturization of the rotating shaft structure 100.

The first shaft body 13 may include a first body part 132 and a first mounting end 133. The first mounting end 133 may be fastened to the first mounting hole 113. The first limiting slot 131 is disposed on the first body part 132. The second shaft body 14 may include a second body part 142 and a second mounting end 143. The second mounting end 143 may be fastened to the second mounting hole 123. The second limiting slot 141 is disposed on the second body part 142. Certainly, in another embodiment, the first shaft body 13 and the first rotating gear 112 are an integrated structure that is integrally formed, and the second shaft body 14 and the second rotating gear 122 are an integrated structure that is integrally formed.

Figure 7:
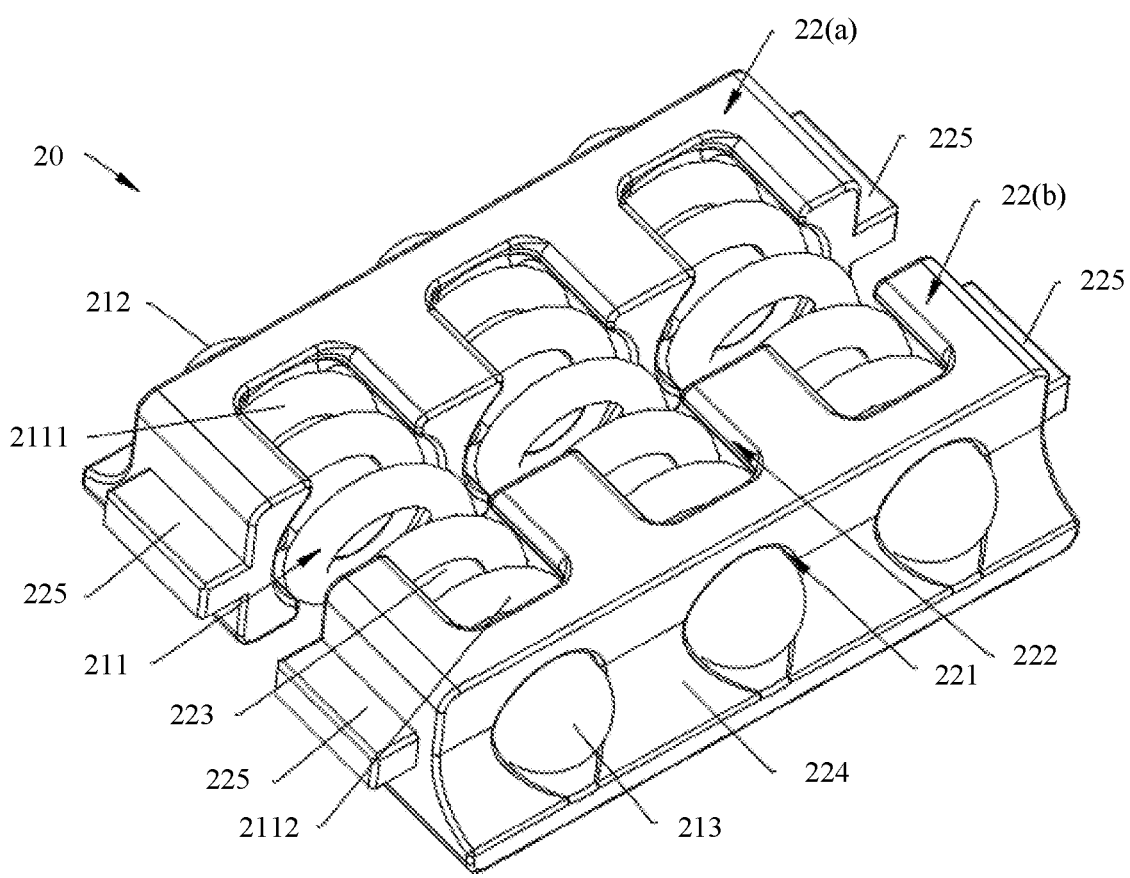
FIG. 7 is a schematic structural diagram of a damping component of the rotating shaft structure shown in FIG. 4.

In this embodiment of this disclosure, the damping component 20 may further include a positioning part or a guide sleeve. The positioning part or the guide sleeve may be disposed between the first ball 212 and the elastic part 211, and between the second ball 213 and the elastic part 211, to ensure relative alignment between the elastic part 211 and each of the first ball 212 and the second ball 213. The positioning part or the guide sleeve in this embodiment of this disclosure has a plurality of implementations that are specifically as follows:

In an implementation, with reference to FIG. 5 and FIG. 7, FIG. 7 is a schematic structural diagram of a damping component of the rotating shaft structure shown in FIG. 4. The positioning part 22 may be disposed between the first ball 212 and the elastic part 211, and between the second ball 213 and the elastic part 211. The first positioning slot 221 and the second positioning slot 222 may be respectively disposed on two opposite surfaces of the positioning part 22. For ease of differentiation, the positioning part 22 disposed between the first ball 212 and the elastic part 211 is a positioning part 22a, and the positioning part 22 disposed between the second ball 213 and the elastic part 211 is a positioning part 22b. The first ball 212 is partially accommodated in the first positioning slot 221 of the positioning part 22a. The first end 2111 of the elastic part 211 is partially located in the second positioning slot 222 of the positioning part 22a. The second ball 213 is partially accommodated in the first positioning slot 221 of the positioning part 22b. The second end 2112 of the elastic part 211 is partially located in the second positioning slot 222 of the positioning part 22b. In other words, the positioning part 22 is configured to: position the first ball 212 and the elastic part 211, and position the second ball 213 and the elastic part 211, that is, the positioning part 22 has a function of ensuring relative alignment between the elastic part 211 and each of the first ball 212 and the second ball 213, so that the elastic part 211 can provide enough elastic force for the first ball 212 and the second ball 213. In this way, the first ball 212 rolls from the circumferential surface of the first shaft body 13 and enters the first limiting slot 131 to implement clamping, and the second ball 213 rolls from the circumferential surface of the second shaft body 14 and enters the second limiting slot 141 to implement clamping. Alternatively, the first ball 212 and the second ball 213 respectively roll out of the first limiting slot 131 and the second limiting slot 141 to implement relative rotation between the first rotating part 11 and the second rotating part 12.

In another possible implementation of this embodiment, the positioning part 22 may further include only the first positioning slot 221. The first ball 212 is partially accommodated in the first positioning slot 221. The first end 2111 of the elastic part 211 is connected to a side that is of the positioning part 22 and that is opposite to the first positioning slot 221. The first end 2111 of the elastic part 211 may be connected in a connection manner such as bonding or clamping to the side that is of the positioning part 22 and that is opposite to the first positioning slot 221. In this implementation, the positioning part is disposed only between the first ball 212 and the elastic part 211, or the positioning part is disposed only between the second ball 213 and the elastic part 211.

The positioning part 22 may further include a positioning cradle 223. The positioning cradle 223 is disposed on the surface that is of the positioning part 22 and that is opposite to the first positioning slot 221. Specifically, the positioning cradle 223 is disposed in the second positioning slot 222, and extends into the first end 2111 of the elastic part 211. In other words, a slot wall of the second positioning slot 222 is disposed around the positioning cradle 223. The positioning cradle 223 is configured to position the first end 2111 of the elastic part 211 in cooperation with the second positioning slot 222, to prevent the elastic part 211 from being inclined and ensure that the elastic part 211 can provide enough elastic force for the first ball 212 and the second ball 213. In this way, the first ball 212 rolls from the circumferential surface of the first shaft body 13 and enters the first limiting slot 131 to implement clamping, and the second ball 213 rolls from the circumferential surface of the second shaft body 14 and enters the second limiting slot 141 to implement clamping. Certainly, in another embodiment, the positioning part 22 may be alternatively not disposed in the positioning part 22.

Figure 8:
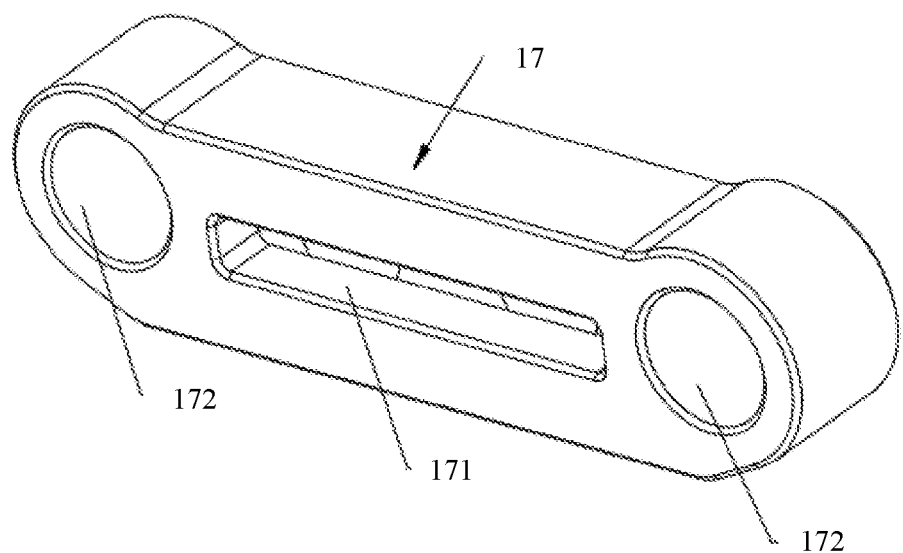
FIG. 8 is a schematic structural diagram of a clamping part of the rotating shaft structure shown in FIG. 5.

With reference to FIG. 5 and FIG. 8, FIG. 8 is a schematic structural diagram of a clamping part of the rotating shaft structure shown in FIG. 5. The positioning part 22 further includes sliding blocks 225. The sliding blocks 225 are disposed on two opposite sides of the positioning part 22. The main shaft component 10 further includes clamping parts 17. The clamping parts 17 are disposed on the two sides of the positioning part 22 of the damping group 21. Two ends of the clamping part 17 are respectively connected to the first shaft body 13 and the second shaft body 14. The first shaft body 13 and the second shaft body 14 can rotate relative to the clamping part 17. In other words, there are two clamping parts 17 between each pair of a first shaft body 13 and a second shaft body 14 opposite to each other. In this embodiment of this disclosure, the clamping part 17 includes a sliding slot 171 and two through holes 172 on two sides of the sliding slot 171. Two first edge parts 134 may be further disposed on two ends of the first body part 132. The first limiting slot 131 is located between the two first edge parts 134. Two second edge parts 144 may be further disposed on two ends of the second body part 142. The second limiting slot 141 is located between the two second edge parts 144. The first edge part 134 of the first shaft body 13 and the second edge part 144 of the second shaft body 14 are respectively located in the through holes 172 corresponding to the first edge part 134 and the second edge part 144, to implement limiting the clamping part 17. The sliding slot 171 is configured to accommodate the sliding blocks 225 corresponding to the sliding slot 171. In other words, the sliding blocks 225 extend into the sliding slot 171 to cooperate with the sliding slot 171 of the clamping part 17, so that the positioning part 22 is balanced in a deformation process of the elastic part 211, thereby implementing good clamping of the first rotating part 11 and the second rotating part 12. In another implementation of this embodiment, there may be one or more sliding blocks 225. There may be one clamping part 17 that is disposed on one side of the positioning part 22. The clamping part 17 may be fastened between the first shaft body 13 and the second shaft body 14 in another manner such as bonding. Alternatively, the clamping part 17 may be connected to another component of the rotating shaft structure 100 to implement limiting.

Figure 9:
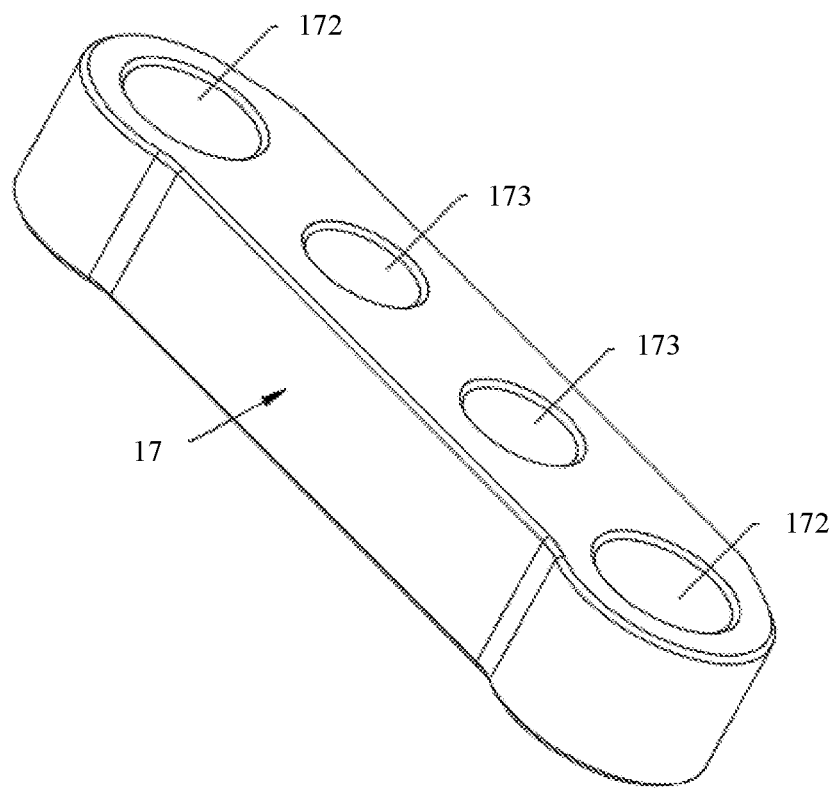
FIG. 9 is a schematic structural diagram from another angle of the clamping part shown in FIG. 8.

In another implementation of this embodiment, FIG. 9 is a schematic structural diagram from another angle of the clamping part shown in FIG. 8. Bearings of the first synchronizing gear 15 and the second synchronizing gear 16 may both roll and be connected to the clamping part 17 close to the two synchronizing gears. Specifically, fixed holes 173 may be disposed on a surface that is of the clamping part 17 close to the first rotating part 11 and that faces the first synchronizing gear 15 and the second synchronizing gear 16. The bearings of the first synchronizing gear 15 and the second synchronizing gear 16 are respectively located in the fixed holes 173 corresponding to the two synchronizing gears. In other words, the clamping part 17 close to the first rotating part 11 is further configured to fasten the first synchronizing gear 15 and the second synchronizing gear 16 while clamping the positioning part 22, so that the first synchronizing gear 15 and the second synchronizing gear 16 are more securely connected between the first rotating part 11 and the second rotating part 12, to facilitate good rotation between the first rotating part 11 and the second rotating part 12. Certainly, in another implementation, the first synchronizing gear 15 and the second synchronizing gear 16 may be alternatively fastened by using another structure, for example, by using the upper cover 32 or the lower cover 31, or by using a structure disposed on the lower cover 31.

In a possible implementation of this embodiment, the first positioning slot 221 and the second positioning slot 222 are respectively disposed on two opposite surfaces of the positioning part 22. The first positioning slot 221 and the second positioning slot 222 are not connected. The elastic force of the elastic part 211 is separately passed to the first ball 212 and the second ball 213 by using the positioning part 22a and the positioning part 22b. In other words, the positioning part 22a and the positioning part 22b are not only configured to maintain relative alignment between the elastic part 211 and each of the first ball 212 and the second ball 213, but also configured to pass force between the elastic part 211 and each of the first ball 212 and the second ball 213. Specifically, the sliding blocks 225 disposed on the same side of the positioning part 22a and the positioning part 22b are located in the sliding slot 171 corresponding to the sliding blocks 225, and may slide relative to the sliding slot 171. Elastic deformation of the elastic part 211 when the first ball 212 enters the first limiting slot 131 is different from elastic deformation of the elastic part 211 when the first ball 212 abuts against the circumferential surface of the first shaft body 13, or elastic deformation of the elastic part 211 when the second ball 213 enters the second limiting slot 141 is different from elastic deformation of the elastic part 211 when the second ball 213 abuts against the circumferential surface of the second shaft body 14. The positioning part 22a located between the elastic part 211 and the first ball 212 and the positioning part 22b located between the elastic part 211 and the second ball 213 may also be located in different positions due to different elastic deformation of the elastic part 211. The clamping part 17 is configured to clamp the positioning part 22. The sliding slot 171 provides specific displacement space for the positioning part 22, to ensure that the positioning part 22 is balanced in a rolling process and further ensure good clamping of the first rotating part 11 and the second rotating part 12.

In another possible implementation of this disclosure, the second positioning slot 222 and the first positioning slot 221 of the positioning part 22a are connected to those of the positioning part 22b. The first end 2111 of the elastic part 211 is located in the second positioning slot 222 of the positioning part 22a and abuts against the first ball 212. The second end 2112 of the elastic part 211 is located in the second positioning slot 222 of the positioning part 22b and abuts against the second ball 213. When the elastic part 211 is elastically deformed, positions of the positioning part 22a and the positioning part 22b are fastened by using the clamping part 17 disposed on two sides of the positioning part 22a and the positioning part 22b. Specifically, the sliding blocks 225 disposed on the same side of the positioning part 22a and the positioning part 22b are fastened in the sliding slot 171 corresponding to the sliding blocks 225. The elastic part 211, the first ball 212, and the second ball 213 are respectively moved relative to the positioning part 22a and the positioning part 22b. The second positioning slots 222 of the positioning part 22a and the positioning part 22b are configured to limit the two ends of the elastic part 211, so that the elastic part 211 is not inclined, to ensure that the elastic part 211 can provide enough elastic force for the first ball 212 and the second ball 213. In other words, the positioning part 22 is only configured to maintain relative alignment between the elastic part 211 and the first ball 212. A position of the positioning part 22 does not change when the elastic part 211 is deformed.

With reference to FIG. 5 and FIG. 7, the positioning part 22 may further include a bearer part 224. The bearer part 224 is located on a surface that is of the positioning part 22 and that includes the first positioning slot 221. The bearer part 224 of the positioning part 22a is configured to bear a part that is of the first ball 212 and that is exposed from the first positioning slot 221, and the bearer part 224 of the positioning part 22b is configured to bear a part that is of the second ball 213 and that is exposed from the first positioning slot 221, to ensure alignment between the elastic part 211 and each of the first ball 212 and the second ball 213 and facilitate disposing the first ball 212 and the second ball 213 between the first shaft body 13 and the second shaft body 14.

Figure 10:
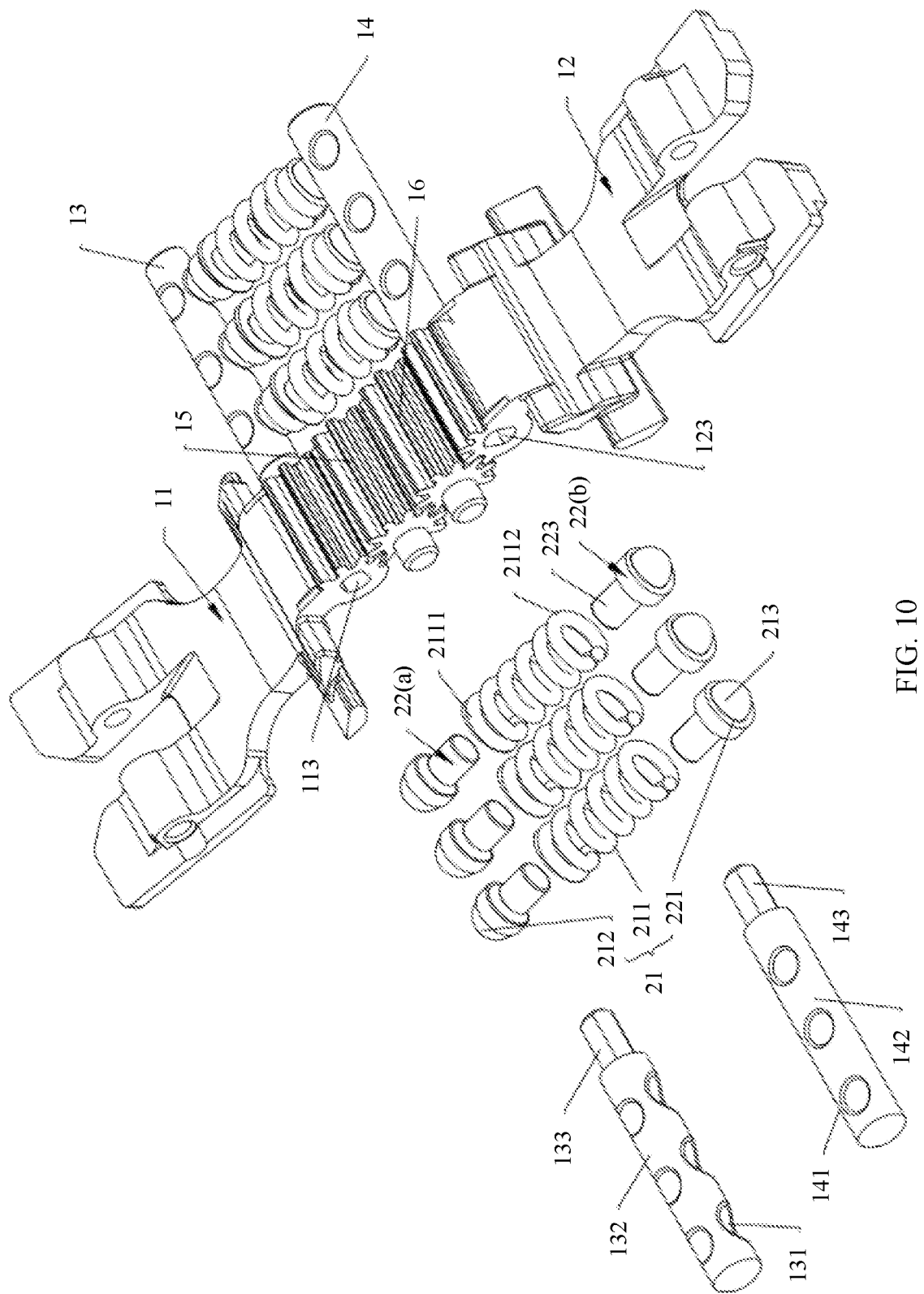
FIG. 10 is a schematic diagram of a partial structure of another rotating shaft structure according to an embodiment of this disclosure.

In another implementation, FIG. 10 is a schematic diagram of a partial structure of another rotating shaft structure 100 according to an embodiment of this disclosure. The positioning part 22 in this implementation is disposed between the first ball 212 and the elastic part 211, and between the second ball 213 and the elastic part 211. The positioning part 22 may include the first positioning slot 221 and the positioning cradle 223. The positioning cradle 223 is disposed on a surface that is of the positioning part 22 and that is opposite to the first positioning slot 221. For ease of differentiation, the positioning part 22 disposed between the first ball 212 and the elastic part 211 is the positioning part 22a, and the positioning part 22 disposed between the second ball 213 and the elastic part 211 is the positioning part 22b. The first end 2111 of the elastic part 211 is sleeved on a periphery of the positioning cradle 223 of the positioning part 22a. A part of the first ball 212 is accommodated in the first positioning slot 221 of the positioning part 22a. The second end 2112 of the elastic part 211 is sleeved on a periphery of the positioning cradle 223 of the positioning part 22b. A part of the second ball 213 is accommodated in the first positioning slot 221 of the positioning part 22b. In other words, the positioning part 22 is configured to: position the first ball 212, the second ball 213, and the elastic part 211, that is, the positioning part 22 has a function of ensuring relative alignment between the elastic part 211 and each of the first ball 212 and the second ball 213, to ensure that the elastic part 211 can provide enough elastic force for the first ball 212 and the second ball 213. In this way, the first ball 212 rolls from the circumferential surface of the first shaft body 13 and enters the first limiting slot 131 to implement clamping, and the second ball 213 rolls from the circumferential surface of the second shaft body 14 and enters the second limiting slot 141 to implement clamping. Alternatively, the first ball 212 and the second ball 213 respectively roll out of the first limiting slot 131 and the second limiting slot 141 to implement relative rotation between the first rotating part 11 and the second rotating part 12. Certainly, in another implementation of this embodiment, the positioning part 22 is disposed only between the first ball 212 and the elastic part 211, or the positioning part 22 is disposed only between the second ball 213 and the elastic part 211. In still another implementation of this embodiment, the clamping part configured to fasten the positioning part 22 may be disposed, so that the positioning part 22 can be more securely sandwiched between the elastic part 211 and each of the first ball 212 and the second ball 213.

In the foregoing several implementations of setting the positioning part 22, the first ball 212 and the second ball 213 can respectively roll in the first positioning slot 221 of the positioning part 22a and that of the positioning part 22b. Therefore, when the first ball 212 and the second ball 213 respectively roll relative to the circumferential surfaces of the first shaft body 13 and the second shaft body 14, the first ball 212 and the second ball 213 respectively roll relative to the circumferential surface of the first shaft body 13 and that of the second shaft body 14, and the first ball 212 and the second ball 213 also roll themselves. In this case, when the first ball 212 rolls relative to the circumferential surface of the first shaft body 13, positions in which the first ball 212 is in contact with the circumferential surface of the first shaft body 13 are different in different positions of the circumferential surface of the first shaft body 13. When the second ball 213 rolls relative to the circumferential surface of the second shaft body 14, positions in which the second ball 213 is in contact with the circumferential surface of the second shaft body 14 are different in different positions of the circumferential surface of the second shaft body 14. In this way, the first ball 212 and the second ball 213 respectively more smoothly roll on the circumferential surface of the first shaft body 13 and that of the second shaft body 14. In addition, the following case is avoided: The first ball 212 and the second ball 213 are deformed because only a part of the first ball 212 and only a part of the second ball 213 are worn in a rolling process, thereby effectively improving service life of the damping component 20. When the first positioning slot and the second positioning slot are not connected, or the positioning part 22 includes the first positioning slot 221 and the positioning cradle 223, the first ball 212 and the second ball 213 may be respectively fastened to the first positioning slot 221 of the positioning part 22a and that of the positioning part 22b. In other words, the first ball 212 and the second ball 213 cannot respectively roll in the first positioning slot 221 of the positioning part 22a and that of the positioning part 22b.

Figure 11:
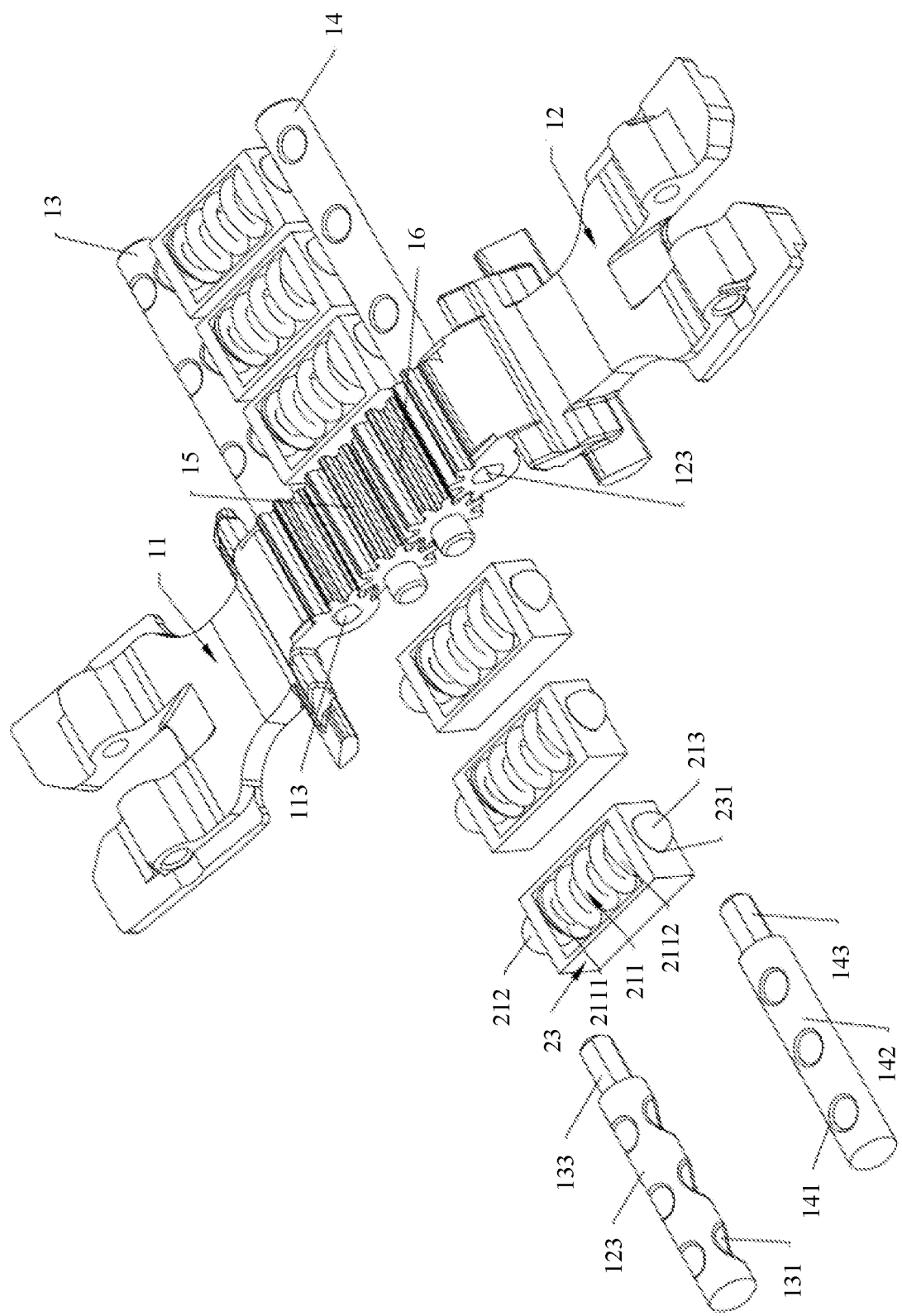
FIG. 11 is a schematic diagram of a partial structure of another rotating shaft structure according to an embodiment of this disclosure.

In still another implementation, FIG. 11 is a schematic diagram of a partial structure of another rotating shaft structure 100 according to an embodiment of this disclosure. A damping component 20 in this implementation may include a guide sleeve 23. A through hole 231 is disposed in the guide sleeve 23. A first end 2111 of an elastic part 211 partially abuts against a first ball 212 partially located in the through hole 231, and a second end 2112 of the elastic part 211 abuts against a second ball 213 located in the through hole 231. In other words, the guide sleeve 23 is configured to: position the first ball 212, the second ball 213, and the elastic part 211, that is, the guide sleeve 23 has a function of ensuring relative alignment between the elastic part 211 and each of the first ball 212 and the second ball 213, to ensure that the elastic part 211 can provide enough elastic force for the first ball 212 and the second ball 213. In this way, the first ball 212 rolls from a circumferential surface of a first shaft body 13 and enters a first limiting slot 131 to implement clamping, and the second ball 213 rolls from a circumferential surface of a second shaft body 14 and enters a second limiting slot 141 to implement clamping. Alternatively, the first ball 212 and the second ball 213 respectively roll out of a first limiting slot 131 and a second limiting slot 141 to implement relative rotation between a first rotating part 11 and a second rotating part 12.

Further, in this embodiment of this disclosure, there may be a plurality of damping groups 21. Correspondingly, there may be a plurality of first limiting slots 131 and a plurality of second limiting slots 141 corresponding to the quantity of the damping groups 21. In addition, the first limiting slots 131 are spaced and disposed in an extension direction of the first shaft body 13, and the second limiting slots 141 are spaced and disposed in an extension direction of the second shaft body 14. The plurality of damping groups 21 are spaced and disposed corresponding to distribution positions of the plurality of first limiting slots 131 and the plurality of second limiting slots 141. In other words, distribution positions of the plurality of damping groups 21 are in a one-to-one correspondence with the distribution positions of the plurality of first limiting slots 131 and the plurality of second limiting slots 141. When the first shaft body 13 and the second shaft body 14 rotate, the first balls 212 roll relative to the circumferential surface of the first shaft body 13 and can be positioned in the first limiting slots 131 corresponding to the first balls 212, and the second balls 213 roll relative to the circumferential surface of the second shaft body 14 and can be positioned in the second limiting slots 141 corresponding to the second balls 213. Correspondingly, there are a plurality of third limiting slots 135 and a plurality of fourth limiting slots 145 in a one-to-one correspondence with the plurality of damping groups 21.

In a possible implementation of this embodiment, there may be one or more positioning parts 22 disposed between the first ball 212 and the elastic part 211 or between the second ball 213 and the elastic part 211. When there is one positioning part 22, one positioning part 22 corresponds to the plurality of first balls 212/second balls 213 and the plurality of elastic parts 211. The positioning part 22 includes a plurality of first positioning slots 221 corresponding to the first balls 212 or the second balls 213 and a plurality of second positioning slots 222 corresponding to the elastic parts 211. In other words, the plurality of first positioning slots 221 are in a one-to-one correspondence with the plurality of first balls 212/second balls 213, and the plurality of second positioning slots 222 are in a one-to-one correspondence with the plurality of elastic parts 211. When there are a plurality of positioning parts 22, the plurality of positioning parts 22 are in a one-to-one correspondence with the plurality of first balls 212/second balls 213 and the plurality of elastic parts 211, that is, one positioning part 22 includes one first positioning slot 221 and one second positioning slot 222. Similarly, there may be one or more guide sleeves disposed between the first ball 212 and the elastic part 211, and between the second ball 213 and the elastic part 211.

As shown in FIG. 5 and FIG. 7, there are three damping groups 21, three first limiting slots 131, three second limiting slots 141, three third limiting slots 135, and three fourth limiting slots 145. Correspondingly, a quantity of first positioning slots 221 and a quantity of second positioning slots 222 of the positioning part are all three. Corresponding to the damping groups 21, the three first positioning slots 221 are spaced and disposed in sequence, and the three second positioning slots 222 are spaced and disposed in sequence. Actually, there may be one or more damping groups 21, first limiting slots 131, second limiting slots 141, third limiting slots 135, and fourth limiting slots 145 according to an actual requirement. A quantity of first positioning slots 221 and a quantity of second positioning slots 222 of the positioning part 22 may be set according to an actual requirement. It may be understood that, a function of setting one damping group 21 between the first shaft body 13 and the second shaft body 14 is the same as a function of setting more damping groups 21 between the first shaft body 13 and the second shaft body 14. A difference is that setting a plurality of damping groups 21 can provide greater force to ensure effective clamping of the first rotating part 11 and the second rotating part 12. The plurality of damping groups 21 are disposed between the first shaft body 13 and the second shaft body 14 to provide enough force to implement effective clamping of the first rotating part 11 and the second rotating part 12.

In a possible implementation of this embodiment of this disclosure, the first shaft body 13 may be disposed on each of two sides of the first rotating part 11 in a direction perpendicular to a first axis. The first shaft body 13 is connected to two opposite axial ends of the first rotating gear 112. The first axis is an axis around which the first rotating part 11 rotates. The first axis is also an axis of the first rotating gear 112. The two opposite axial ends of the first rotating gear 112 are two ends of the first rotating gear 112 in an axial direction. The second shaft body 14 is disposed on each of two sides of the second rotating part 12 in a direction perpendicular to a second axis. The second shaft body 14 is connected to two opposite axial ends of the second rotating gear 122. The second axis is an axis around which the second rotating part 12 rotates. The second axis is also an axis of the second rotating gear 122. The first axis and the second axis are parallel. The two opposite axial ends of the second rotating gear 122 are two ends of the second rotating gear 122 in the axial direction. The damping component 20 is disposed between the first shaft body 13 and the second shaft body 14. In other words, the damping component 20 is disposed between the first shaft body 13 and the second shaft body 14 on the same axial end side of the first rotating gear 112. In other words, two first shaft bodies 13 are respectively disposed on two sides of the first rotating gear 112, and two second shaft bodies 14 are respectively disposed on two sides of the second rotating gear 122. The two first shaft bodies 13 are correspondingly disposed opposite to the two second shaft bodies 14. The damping component 20 is disposed between the first shaft body 13 and the second shaft body 14 on the same side. A damping group quantity of the damping groups 20 on one side of the first rotating gear 112 may be the same as or different from that of the damping groups 20 on the other side of the first rotating gear 112. The first shaft bodies 13 and the second shaft bodies 14 are respectively disposed on two sides of the first rotating gear 112 and two sides of the second rotating gear 122. In this way, the damping component 20 disposed between the first shaft body 13 and the second shaft body 14 disposed opposite to the first shaft body 13 maintains force balance on the two sides of the first rotating gear 112 and the two sides of the second rotating gear 122. The first shaft body 13 and the second shaft body 14 are respectively disposed at the axial ends of the first rotating gear 112 and the second rotating gear 122, so that the first shaft body 13 and the second shaft body 14 respectively rotate with rotation of the first rotating part 11 and the second rotating part 12.

In another possible implementation of this embodiment of this disclosure, the first shaft body 13 may be disposed on one side of the first rotating part 11 in a direction perpendicular to a first axis. The first shaft body 13 is connected to one axial end of the first rotating gear 112. The first axis is an axis around which the first rotating part 11 rotates. The first axis is also an axis of the first rotating gear 112. The axial end of the first rotating gear 112 is an end of the first rotating gear 112 in an axial direction. The second shaft body 14 is disposed on one side of the second rotating part 12 in a direction perpendicular to a second axis. The second shaft body 14 is connected to one axial end of the second rotating gear 122. The second axis is an axis around which the second rotating part 12 rotates. The second axis is also an axis of the second rotating gear 122. The first axis and the second axis are parallel. The first shaft body 13 and the second shaft body 14 are located on the same side of the first rotating gear 112. The axial end of the second rotating gear 122 is an end of the second rotating gear 122 in an axial direction. A damping component 20 is disposed between the first shaft body 13 and the second shaft body 14.

The foregoing descriptions are merely some embodiments and implementations of this disclosure, and the protection scope of this disclosure is not limited thereto. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A rotating shaft structure, comprising a main shaft component and a damping component, wherein:
    the main shaft component comprises a first shaft body and a second shaft body; the first shaft body and the second shaft body are spaced and disposed opposite to each other; and a first limiting slot is disposed on a circumferential surface of the first shaft body;
    the damping component is located between the circumferential surface of the first shaft body and a circumferential surface of the second shaft body; the damping component comprises one or more damping groups; each damping group comprises an elastic part and a first ball that is spherical in shape; the first ball is located at a first end of the elastic part; the first ball abuts against the circumferential surface of the first shaft body by using elastic force of the elastic part; and a second end that is of the elastic part and that is opposite to the first end is elastically connected to the circumferential surface of the second shaft body; and
    in a rotation process of the first shaft body, the first ball rolls relative to the circumferential surface of the first shaft body and can be positioned in the first limiting slot by the elastic part providing thrust force for the first ball to push the first ball into the first limiting slot.

2. The rotating shaft structure according to claim 1, wherein:
    each damping group further comprises a second ball; the second ball is located at the second end of the elastic part; the second ball abuts against the circumferential surface of the second shaft body by using the elastic force of the elastic part; a second limiting slot is disposed on the circumferential surface of the second shaft body; and in a rotation process of the second shaft body, the second ball rolls relative to the circumferential surface of the second shaft body and can be positioned in the second limiting slot.

3. The rotating shaft structure according to claim 1, wherein:
    the damping component further comprises a positioning part; the positioning part is disposed between the first ball and the elastic part; the positioning part comprises a first positioning slot; the first ball is partially accommodated in the first positioning slot; and the first end of the elastic part is connected to a surface that is of the positioning part and that is opposite to the first positioning slot.

4. The rotating shaft structure according to claim 3, wherein:
the positioning part comprises a positioning cradle; the positioning cradle is disposed on the surface that is of the positioning part and that is opposite to the first positioning slot; and the positioning cradle extends into the first end of the elastic part.

5. The rotating shaft structure according to claim 4, wherein:
the positioning part further comprises a second positioning slot; the second positioning slot and the first positioning slot are respectively located on two opposite surfaces of the positioning part; the elastic part is partially accommodated in the second positioning slot; and the elastic force of the elastic part is passed to the first ball by using the positioning part.

6. The rotating shaft structure according to claim 5, wherein:
the main shaft component further comprises a pair of clamping parts; the pair of clamping parts are disposed on two sides of the damping groups; the clamping part comprises a sliding slot; two sides of the positioning part comprise sliding blocks; the sliding block is located in the sliding slot; and when the elastic part is elastically deformed, the sliding block slides in the sliding slot.

7. The rotating shaft structure according to claim 6, wherein two ends of the clamping part are respectively connected to the first shaft body and the second shaft body, and the first shaft body and the second shaft body can rotate relative to the clamping part.

8. The rotating shaft structure according to claim 3, wherein the positioning part comprises a bearer part, and the bearer part is configured to bear a part that is of the first ball and that is exposed from the first positioning slot.

9. The rotating shaft structure according to claim 1, wherein:
the damping component comprises a guide sleeve; the guide sleeve is provided with a through hole; the elastic part is located in the guide sleeve; and the first end abuts against the first ball partially located in the through hole.

10. The rotating shaft structure according to claim 3, wherein the first ball can roll in the first positioning slot.

11. The rotating shaft structure according to claim 2, wherein:
the rotating shaft structure further comprises a first rotating part and a second rotating part; the first rotating part and the second rotating part can rotate relative to each other; the first rotating part is fastened to the first shaft body; the second rotating part is fastened to the second shaft body; the first shaft body and the second shaft body respectively rotate with rotation of the first rotating part and the second rotating part; and when the first rotating part and the second rotating part are flattened relative to each other, the first ball is in the first limiting slot, and the second ball is in the second limiting slot.

12. The rotating shaft structure according to claim 11, wherein:
a third limiting slot spaced from the first limiting slot is further disposed in a rotation direction of the first shaft body, and a fourth limiting slot spaced from the second limiting slot is further disposed in a rotation direction of the second shaft body; and when the first rotating part and the second rotating part are folded, the first ball is located in the third limiting slot, and the second ball is located in the fourth limiting slot.

13. The rotating shaft structure according to claim 1, wherein:
the rotating shaft structure comprises an accommodation part; the accommodation part comprises an upper cover and a lower cover; the upper cover and the lower cover are engaged with each other; and the main shaft component and the damping component are accommodated between the upper cover and the lower cover.

14. An electronic device, comprising a first enclosure, a second enclosure, a flexible screen, and a rotating shaft structure, wherein:
the rotating shaft structure comprises a main shaft component and a damping component;
the main shaft component comprises a first shaft body and a second shaft body; the first shaft body and the second shaft body are spaced and disposed opposite to each other; and a first limiting slot is disposed on a circumferential surface of the first shaft body;
the damping component is located between the circumferential surface of the first shaft body and a circumferential surface of the second shaft body; the damping component comprises one or more damping groups; each damping group comprises an elastic part and a first ball that is spherical in shape; the first ball is located at a first end of the elastic part; the first ball abuts against the circumferential surface of the first shaft body by using elastic force of the elastic part; and a second end that is of the elastic part and that is opposite to the first end is elastically connected to the circumferential surface of the second shaft body;
in a rotation process of the first shaft body, the first ball rolls relative to the circumferential surface of the first shaft body and can be positioned in the first limiting slot by the elastic part providing thrust force for the first ball to push the first ball into the first limiting slot; and
the first enclosure and the second enclosure are located on two sides of the rotating shaft structure; the first enclosure is connected to the first shaft body; the second enclosure is connected to the second shaft body; and the flexible screen is disposed on the first enclosure, the rotating shaft structure, and the second enclosure.

15. The electronic device according to claim 14, wherein:
each damping group further comprises a second ball; the second ball is located at the second end of the elastic part; the second ball abuts against the circumferential surface of the second shaft body by using the elastic force of the elastic part; a second limiting slot is disposed on the circumferential surface of the second shaft body; and in a rotation process of the second shaft body, the second ball rolls relative to the circumferential surface of the second shaft body and can be positioned in the second limiting slot.

16. The electronic device according to claim 14, wherein:
the damping component further comprises a positioning part; the positioning part is disposed between the first ball and the elastic part; the positioning part comprises a first positioning slot; the first ball is partially accommodated in the first positioning slot; and the first end of the elastic part is connected to a surface that is of the positioning part and that is opposite to the first positioning slot.

17. The electronic device according to claim 16, wherein:
the positioning part comprises a positioning cradle; the positioning cradle is disposed on the surface that is of the positioning part and that is opposite to the first positioning slot; and the positioning cradle extends into the first end of the elastic part.

18. The electronic device according to claim 17, wherein:
the positioning part further comprises a second positioning slot; the second positioning slot and the first positioning slot are respectively located on two opposite surfaces of the positioning part; the elastic part is partially accommodated in the second positioning slot; and the elastic force of the elastic part is passed to the first ball by using the positioning part.

19. The electronic device according to claim 18, wherein:
the main shaft component further comprises a pair of clamping parts; the pair of clamping parts are disposed on two sides of the damping groups; the clamping part comprises a sliding slot; two sides of the positioning part comprise sliding blocks; the sliding block is located in the sliding slot; and when the elastic part is elastically deformed, the sliding block slides in the sliding slot.

20. The electronic device according to claim 19, wherein two ends of the clamping part are respectively connected to the first shaft body and the second shaft body, and the first shaft body and the second shaft body can rotate relative to the clamping part.

\* \* \* \* \*